(12) United States Patent
Sadek et al.

(10) Patent No.: US 12,143,878 B2
(45) Date of Patent: Nov. 12, 2024

(54) LINE-OF-SIGHT HUMAN BLOCKAGE MODELING AND PREDICTION

(71) Applicant: Samsung Electronics Co., Ltd., Gyeonggi-do (KR)

(72) Inventors: Mirette Sadek, San Diego, CA (US); Hongbing Cheng, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 17/728,340

(22) Filed: Apr. 25, 2022

(65) Prior Publication Data

US 2022/0400419 A1    Dec. 15, 2022

Related U.S. Application Data

(60) Provisional application No. 63/191,532, filed on May 21, 2021.

(51) Int. Cl.
| | |
|---|---|
| *H04W 36/00* | (2009.01) |
| *G06N 3/044* | (2023.01) |
| *H04B 17/318* | (2015.01) |
| *H04W 4/029* | (2018.01) |
| *H04W 4/33* | (2018.01) |

(52) U.S. Cl.
CPC ...... *H04W 36/00837* (2018.08); *G06N 3/044* (2023.01); *H04B 17/318* (2015.01); *H04W 4/029* (2018.02); *H04W 4/33* (2018.02)

(58) Field of Classification Search
None
See application file for complete search history.

(56) References Cited

U.S. PATENT DOCUMENTS

| | | | |
|---|---|---|---|
| 9,993,166 B1 | 6/2018 | Johnson et al. | |
| 11,159,408 B2 | 10/2021 | Svennebring et al. | |
| 11,889,369 B1* | 1/2024 | Dharmadhikari ... | H04W 36/324 |
| 2015/0031387 A1* | 1/2015 | Mansour ................ | H04W 4/02 |
| | | | 455/456.1 |
| 2016/0071526 A1 | 3/2016 | Wingate et al. | |

(Continued)

FOREIGN PATENT DOCUMENTS

CN    109829386    5/2019

OTHER PUBLICATIONS

G. R. MacCartney et al., "Millimeter-Wave Human Blockage at 73 GHz with a Simple Double Knife-Edge Diffraction Model and Extension for Directional Antennas," IEEE 84th Vehicular Technology Conference (VTC-Fall), Montreal, 2016, pp. 6.

(Continued)

*Primary Examiner* — Robert M Morlan
(74) *Attorney, Agent, or Firm* — The Farrell Law Firm, P.C.

(57) ABSTRACT

Disclosed is a method for determining whether to trigger of a conditional handover, including estimating, using a line-of-sight (LoS) channel, a received signal power as a function of a blocker used to simulate a human body, determining multiple stages of potential blockage of the received signal power by the blocker, predicting, using long-short-term memory (LTSM), a channel state and the potential blockage, and determining whether to trigger the conditional handover based on the predicted channel state and potential blockage.

20 Claims, 27 Drawing Sheets

(56) References Cited

U.S. PATENT DOCUMENTS

2019/0150867 A1   5/2019  Itou et al.
2023/0370883 A1*  11/2023  Lauridsen ........... H04W 36/302

OTHER PUBLICATIONS

C. Slezak et al., "Empirical Effects of Dynamic Human-Body Blockage in 60 GHz Communications," IEEE Communications Magazine, IEEE Communications Magazine, pp. 60-66, Dec. 2018.

S. H. A. Shah et al., "LSTM-Based Multi-Link Prediction for mmWave and Sub-THz Wireless Systems," ICC—2020 IEEE International Conference on Communications, Dublin, 2020, pp. 6.

G. R. MacCartney et al., "Rapid Fading Due to Human Blockage in Pedestrian Crowds at 5G Millimeter-Wave Frequencies," 2017 IEEE Global Communications Conference (GLOBECOM), Singapore, 2017, pp. 7.

J. Kunisch et al., "Ultra-wideband double vertical knife-edge model for obstruction of a ray by a person," IEEE International Conference on Ultra-Wideband, Hannover, 2008, pp. 4.

U. T. Virk et al., "Modeling Human Blockage at 5G Millimeter-Wave Frequencies," IEEE Transactions on Antennas and Propagation, vol. 68, No. 3, pp. 2256-2266, Mar. 2020.

I. F. Akyildiz et al., "Realizing ultra massive MIMO (1024×1024) communication in the (0.06-10) terahertz band," Nano communication networks, vol. 8, pp. 46-54, 2016.

Sean Victor Hum, "Diffraction", Radio and Microwave Wireless Systems, https://www.waves.utoronto.ca/prof/svhum/ece422/notes/19-diffraction.pdf, 2018, pp. 11.

Christopher Olah, "Understanding LSTM Networks", https://colah.github.io/posts/2015-08-Understanding-LSTMs/, Aug. 27, 2015, pp. 8.

Mohammad Fneish, "Keras_LSTM_Diagram", https://github.com/MohammadFneish7/Keras_LSTM_Diagram, Jul. 23, 2021, pp. 4.

3GPP, "TR 38.901 Study on channel model for frequencies from 0.5 to 100 GHz (Release 16)", Nov. 2020, pp. 103.

G. Solmaz et al., "A Survey of Human Mobility Models," IEEE Access, 2019, pp. 21.

A. Hess et al., "Data-driven Human Mobility Modeling: A Survey and Engineering Guidance for Mobile Networking," ACM Computing surveys, 2016, pp. 40.

Paul Peter Urone et al., "Huygens's Principle: Diffraction", College Physics, https://courses.lumenlearning.com/austincc-physics2/chapter/27-2-huygenss-principle-diffraction/, Jun. 21, 2012, pp. 10.

Wikipedia. 2022. "Fresnel zone" Jan. 21, 2022, https://en.wikipedia.org/wiki/Fresnel_zone, pp. 7.

B. A. Bilgin et al., "Human Blockage Model for Indoor Terahertz Band Communication," 2019 IEEE International Conference on Communications Workshops (ICC Workshops), Shanghai, China, 2019, pp. 6.

* cited by examiner

LINE-OF-SIGHT HUMAN BLOCKAGE MODELING AND PREDICTION

PRIORITY

This application is based on and claims priority under 35 U.S.C. § 119(e) to U.S. Provisional Application Ser. No. 63/191,532, which was filed in the U.S. Patent and Trademark Office on May 21, 2021, the contents of which are incorporated herein by reference.

BACKGROUND

1. Field

The disclosure relates generally to line-of-sight (LoS) human blockage analysis using artificial intelligence (AI), and more specifically, to use of long-short-term memory (LSTM) for predicting a terahertz (THz) channel state and identifying a potential blockage.

2. Description of Related Art

THz communications is the next frontier in the spectrum for sixth generation (6G) wireless communications due to the provision of unprecedented wide bands. THz channels suffer from high path loss and molecular absorption that are typical of their frequency range. To overcome severe attenuation, THz communication systems rely mainly on short LoS channels with narrow beams using massive multiple input multiple output (MIMO) or highly directional antennas, which is a direct path between the transmitter (Tx) and the receiver (Rx). For example, in an office layout, the Tx could be a router mounted on a wall with a wireless antenna and the Rx could be a mobile device or a laptop computer. Typically, the Rx is lower, in height, than the Tx in such a scenario.

LoS communication plays an important role in the case of higher frequency bands, such as millimeter waves (mm-Waves) in the range of about 30 gigahertz (GHz) to 300 GHz and THz in the range of about 0.1 THz to 10 THz. High frequency communication relies on short direct paths between a transmitter and a receiver in order to combat fading and rapid pathloss. In an LoS scenario, a blockage event may be defined as any object that intercepts the LoS path resulting in a partial or total loss of received signal power at the receiver.

An early detection of a blockage event is highly advantageous to the system performance since it can trigger a handover (HO) at the onset of blockage to avoid a decrease in the link quality. A prediction of a blockage event provides even more protection from link failure since it can trigger a conditional HO (CHO), which is an early HO triggered before the onset of blockage.

Another useful application in human blockage detection and/or prediction is the classification of channels into LoS and non-LoS (NloS), which contributes to improving the accuracy of user equipment (UE) localization since an LoS assumption is made at the core of some localization algorithms. The absence of such an assumption can render some measurements/estimates inaccurate and consequently exclude them from the UE location estimation process, thus increasing the localization accuracy.

Conventionally, human blockage has been studied in the context of mmWaves and sub-THz frequencies. For example, a comprehensive classification of conventional human blockage models includes: a) absorbing screen models, such as the double knife-edge diffraction (DKED) models and the multiple knife-edge diffraction (MKED) models including the single-truncated multiple knife-edge (STMKE) diffraction model; b) conducting screen and wedge models; c) cylinder models; and d) other heuristic models, such as measurement-based models and the third generation partnership project (3GPP)/mmMagic model.

Herein, a double-truncated multiple knife edge (DTMKE) diffraction model is considered (see FIG. 5). This model is a modification of the MKED model and uses indoor measurements (anechoic chamber) in order to validate the model.

In the 3GPP channel model (38,901), there are 2 models for blockage: model A is stochastic and model B is geometric. Model A assumes complete blockage (no signal) for certain receive angles for which the model gives the angle range and probability distribution. Model B assumes the blocker as a finite screen and derives the attenuation Equations based the DKED model. This model is valid for any frequency.

DTMKE is based on the DKED model and is much more comprehensive since it accounts for the actual shape of the human body which is represented by two screens (see FIG. 5) in the model rather than one screen (see FIG. 2). Thus, DTMKE models diffraction on all relevant edges based on the angle at which the human blocker intercepts the LoS and is not specific to the THz frequency range. DTMKE models the "diffractor" (human body) more accurately, whereas the DKED model is only accurate in a limited number of scenarios, depending on the orientation of the human body with respect to the LoS being blocked by the body.

However, the Equations given in 3GPP 38.901 are for a simple model that assumes an omnidirectional transmission and reception, which is inapplicable to THz. Thus, the simple model is more inaccurate in higher frequencies, such as THz, compared to lower frequencies when there is beamforming.

Therefore, there is a need in the art for a diffraction model which uses not only a DTMKE model but also beamforming Equations to account for highly directional transmitted and received beams.

SUMMARY

The present disclosure has been made to address at least the above-mentioned problems and/or disadvantages and to provide at least the advantages described below.

Accordingly, an aspect of the present disclosure is to provide a method and apparatus that focus on blockage caused by human movement, usually in an indoor environment.

Another aspect of the disclosure is to provide a method and apparatus that focus on modeling a human blockage event and an algorithm for efficiently predicting the blockage event.

In accordance with an aspect of the disclosure, a method is provided for determining whether to trigger of a conditional handover including estimating, using an LoS channel, a received signal power as a function of a blocker that simulates a human body, determining multiple stages of potential blockage of the received signal power by the blocker, predicting, using LTSM, a channel state and the potential blockage, and determining whether to trigger the conditional handover based on the predicted channel state and potential blockage.

In accordance with an aspect of the disclosure, an electronic device is provided, which includes at least one processor, and at least one memory operatively connected with the at least one processor, the at least one memory storing instructions, which when executed, instruct the at least one processor to determine whether to trigger a conditional handover by estimating, using an LoS channel, a received signal power as a function of a blocker that simulates a human body, determining multiple stages of potential blockage of the received signal power by the blocker, predicting, using LTSM, a channel state and the potential blockage, and determining whether to trigger the conditional handover based on the predicted channel state and potential blockage.

BRIEF DESCRIPTION OF THE DRAWINGS

The above and other aspects, features, and advantages of certain embodiment of the present disclosure will be more apparent from the following detailed description taken in conjunction with the accompanying drawings, in which.

DETAILED DESCRIPTION

Figure 1:
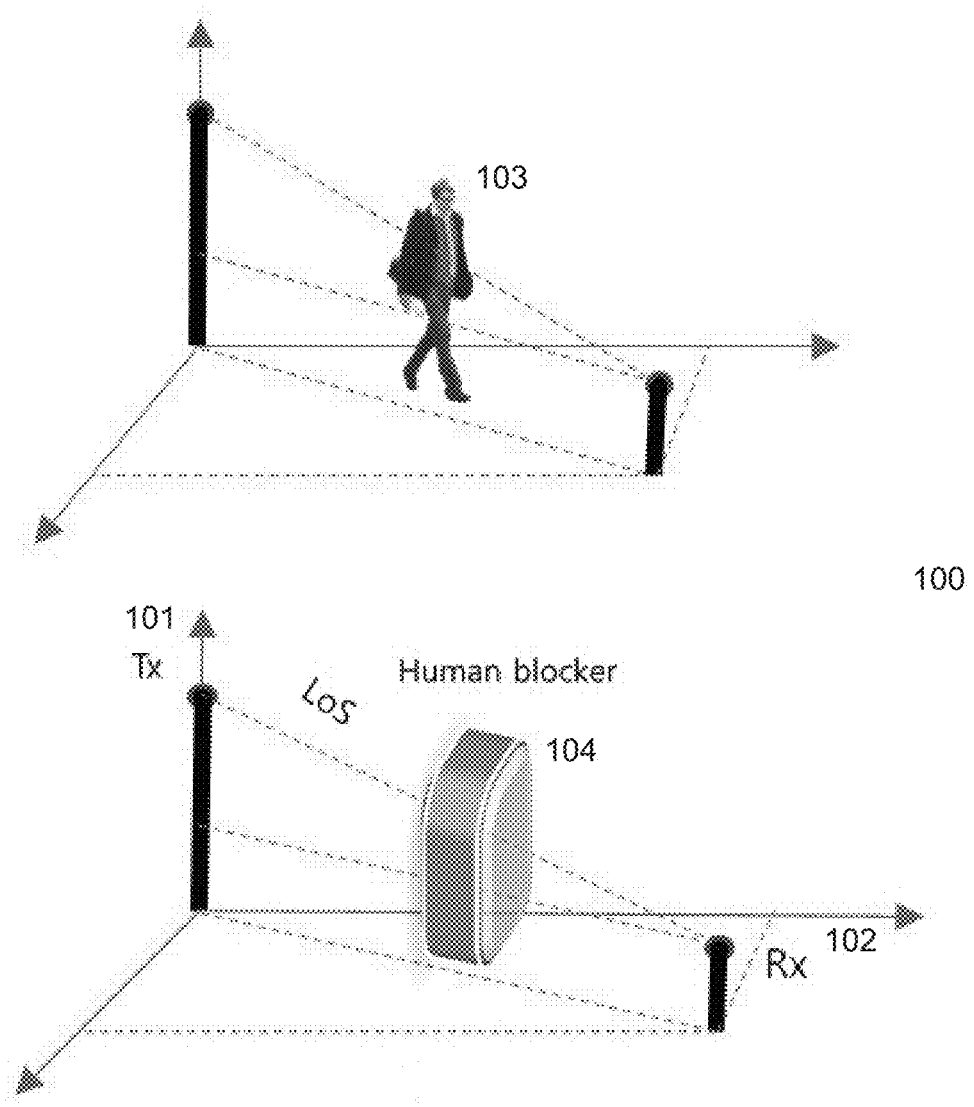
FIG. 1 illustrates a human blockage example illustration and representation, to which the disclosure is applied.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

In the disclosure, various linear and planar phased array antennas may be described, with a focus on a 1024×1024 planar array, but the disclosure is not limited thereto.

DTMKE Model

The DTMKE diffraction model improves on the STMKE diffraction model by considering diffraction between the legs (represented by diffraction at the bottom edge of the screen). The term "double" truncated is due to the human body being represented by two orthogonal finite screens to capture the three-dimensional nature of the human body. One of the screens represents the body front having breadth from shoulder-to-shoulder and the other screen represents the body side having breadth representing the arm and body thickness. Only one of the two screens is used at a time to represent the body based on the body orientation. The expression "knife edge" refers to the well-known diffraction model that assumes a sharp edge that diffracts waves. The term "multiple" is used to indicate that, in general, the human body contains multiple edges that diffract waves.

Based on comparison with actual measurements at 15, 28, and 60 GHz, the MKED models (including DTMKE) have been understood to provide better agreement with measurements when the orientation of a human body is arbitrary and when mobile and base station antennas heights are different.

FIG. 1 illustrates a human blockage example 100, to which the disclosure is applied.

In FIG. 1, a Tx 101 and an Rx 102 are shown at different heights. In this case, the human body 103 can be represented by a cuboid 104, as shown.

Figure 2:
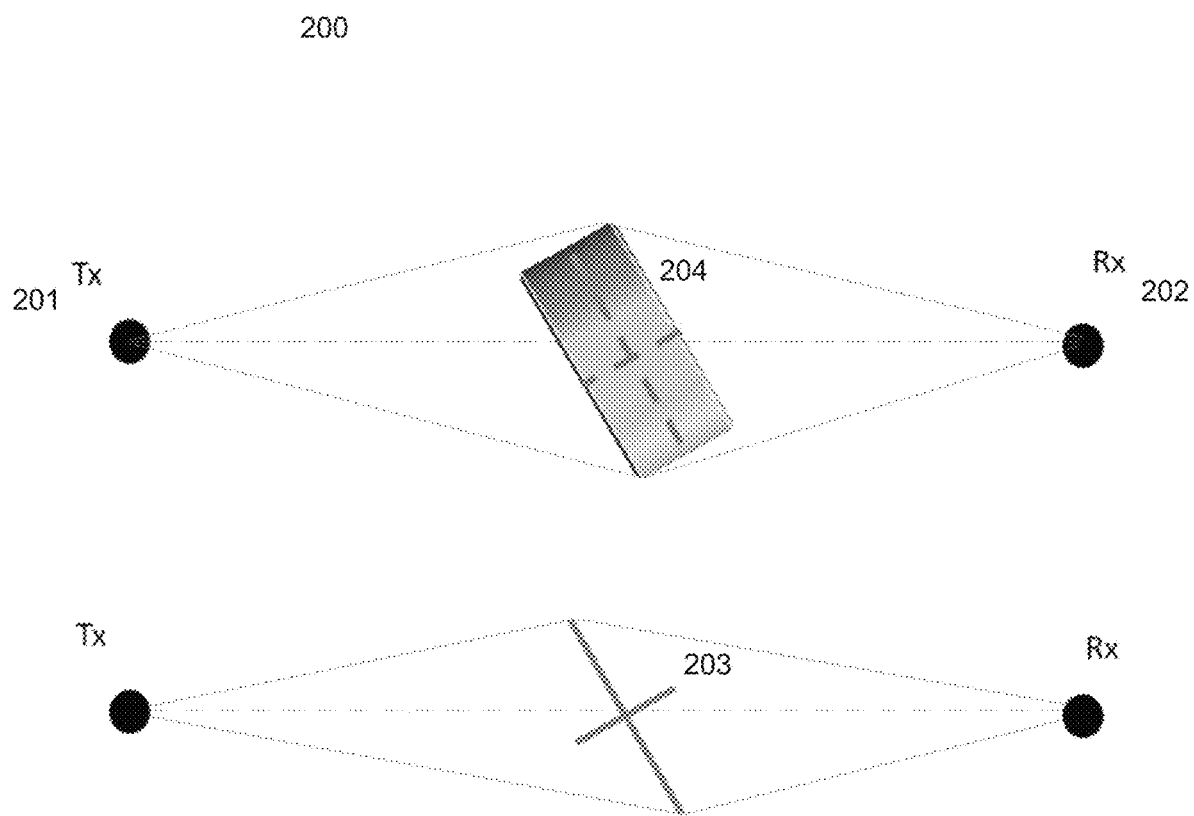
FIG. 2 illustrates a top view of both the cuboid representation and the simplified screen representation, to which the disclosure is applied.

FIG. 2 illustrates a top view 200 of both the cuboid representation 204 and the simplified screen representation 203, to which the disclosure is applied.

In FIG. 2, a Tx 201 and an Rx 202 are shown at approximately the same height.

Figure 3:
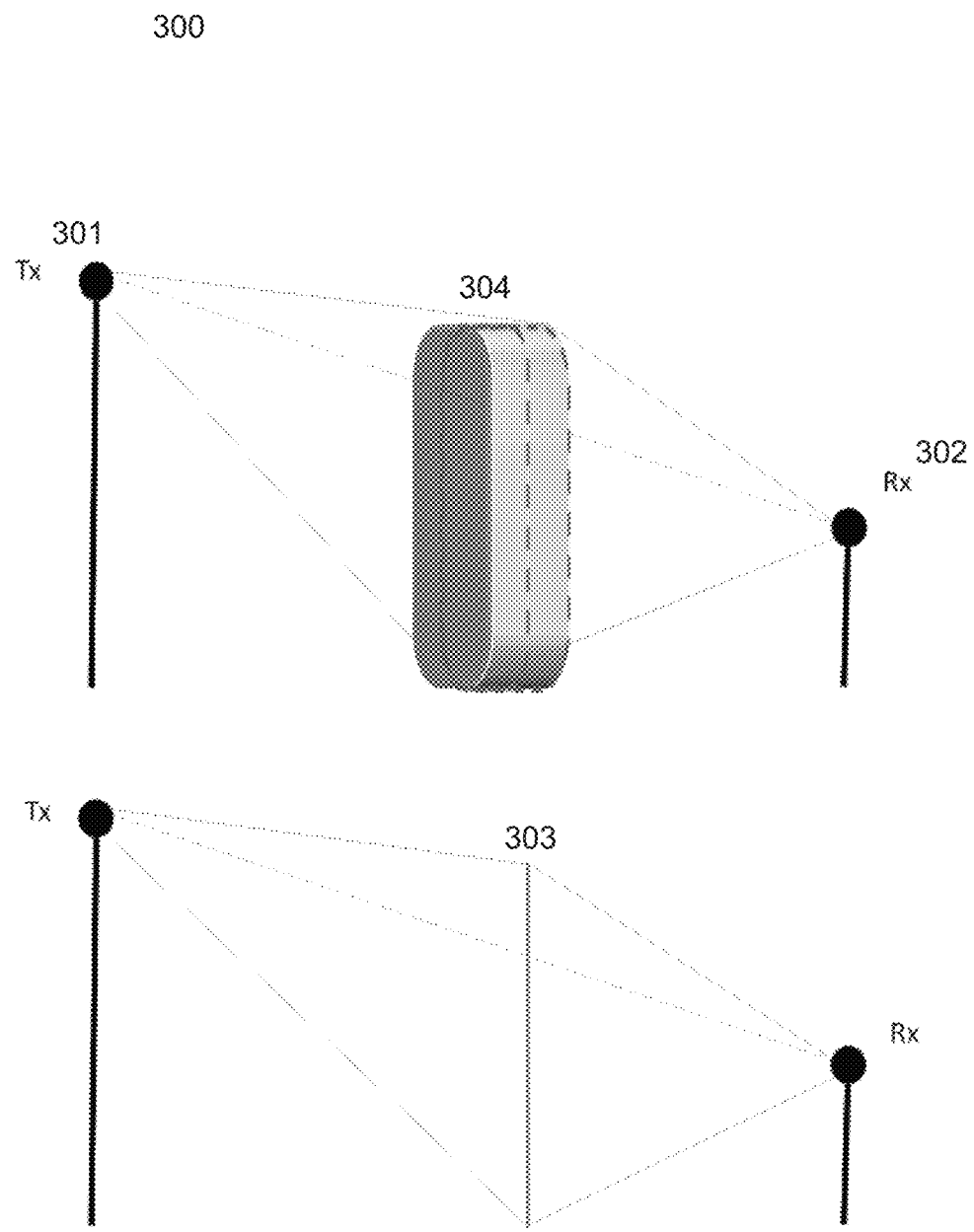
FIG. 3 illustrates a side view of both the cuboid representation and the simplified screen representation, to which the disclosure is applied.

FIG. 3 illustrates a side view 300 of both the cuboid representation 304 and the simplified screen representation 303, to which the disclosure is applied.

In FIG. 3, a Tx 301 and an Rx 302 are shown at different heights.

Figure 4:
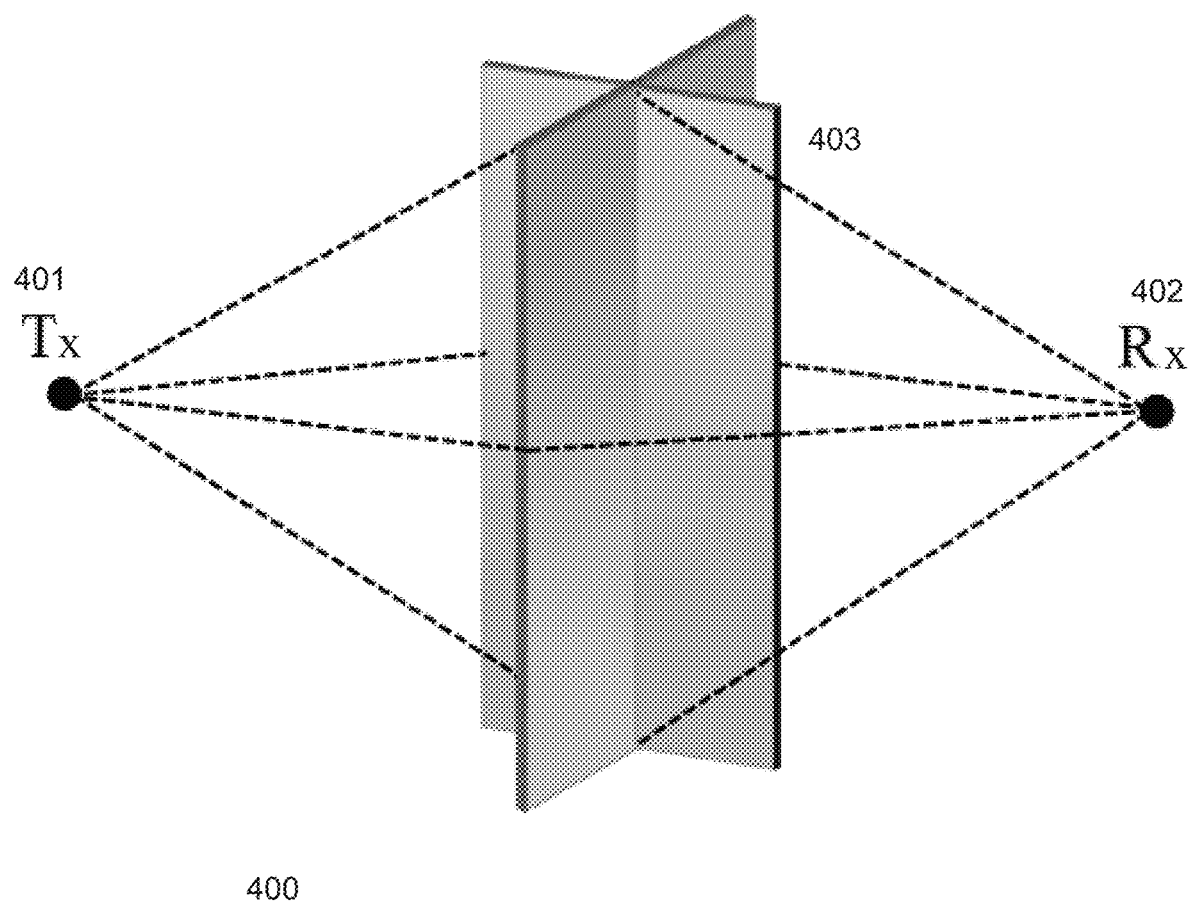
FIG. 4 illustrates a dual screen model for a human blocker, according to an embodiment.

FIG. 4 illustrates a dual screen model 400 for a human blocker 403, according to an embodiment. Specifically, although the cuboid 304 is a more accurate representation of the human body 103, the simplified screen representation 303 is adopted. Thus, the resultant is the dual screen model 403 as shown in FIG. 4 with the Tx 401 and Rx 402 shown at approximately the same height.

In order to eliminate confusion as to what edges of which screens should be used to calculate the diffracted signal, depending on the orientation of the two intersecting screens, only one of the two screens with the larger cross section seen from the Tx-Rx link is used for calculating the diffracted paths.

The following in Table 1 provides symbols used in the geometry of this scenario:

TABLE 1

| Symbol | Description |
| --- | --- |
| h | Human blocker height |
| l | Human blocker length (across chest) |
| w | Human blocker width (thickness) |

TABLE 1-continued

| Symbol | Description |
| --- | --- |
| δ | Angle of human blocker motion referred to the y-axis |
| φ | Angle of the Tx-Rx LoS referred to the y-axis |

The disclosure considers both the XY plane (top view) and the ZY' plane (side view) where Y' is an axis along the projection of the Tx-Rx LoS on the XY plane.

XY Plane (Top View)

As mentioned above and as illustrated in FIG. 4, the human blocker 403 is represented by 2 orthogonal screens. Depending on the human blocker azimuth orientation, one of the screens has a larger projection orthogonal to the Tx-Rx LoS and is thus used to estimate the side diffraction.

Figure 5:
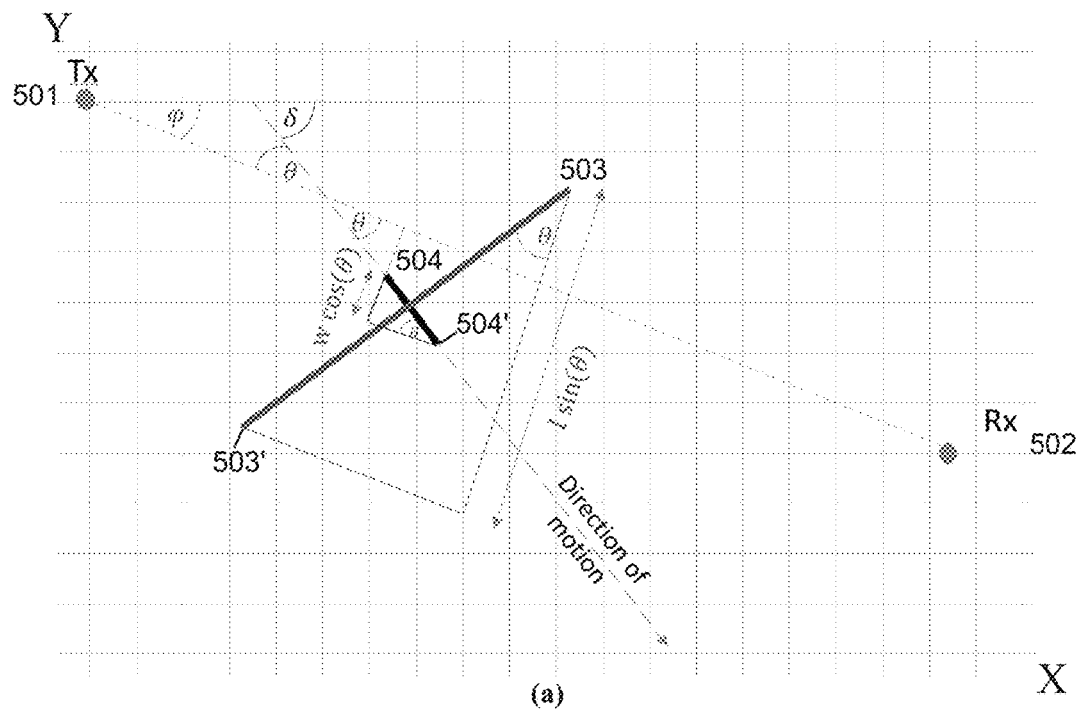
FIG. 5 illustrates a top view for when the side diffraction occurs around the side edges of the larger screen, according to an embodiment.
Figure 5:
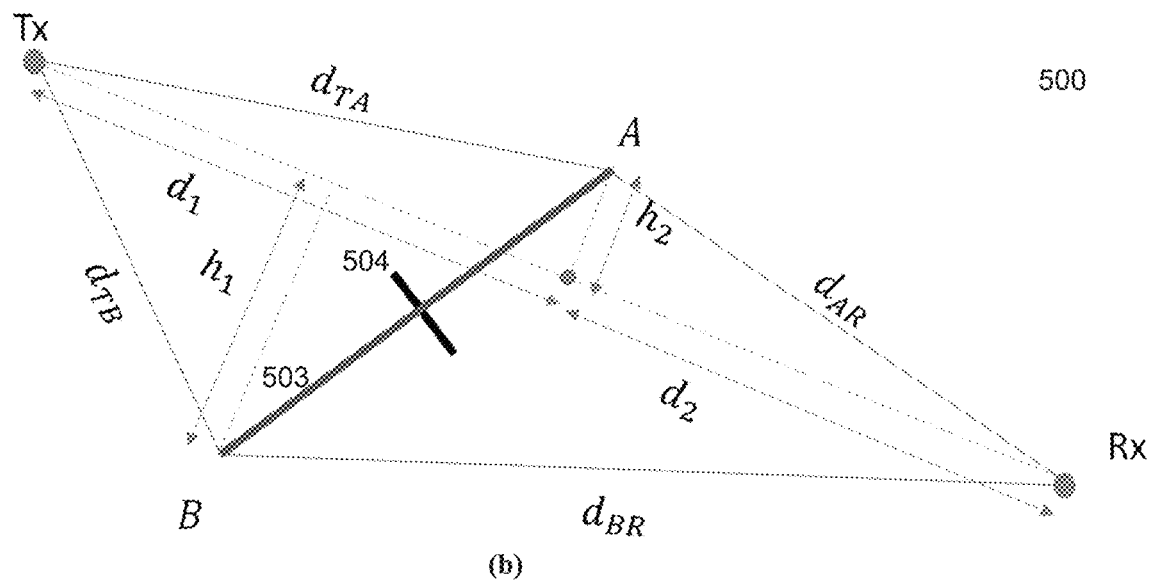

FIG. 5 illustrates a top view 500 for when side diffraction occurs around the side edges 503' of the larger screen 503, according to an embodiment.

A top view for a human blocker when side diffraction occurs not around the side edges 504' of the smaller screen 504 but around the side edges 503' of the larger screen 503 is illustrated in section (a) of FIG. 5, and angles are used to determine which screen has the larger projection orthogonal to the Tx 501-Rx 502 LoS direction. In section (b) of FIG. 5, the screen 503 with the larger projection is used to calculate the diffraction parameters.

Specifically, section (a) illustrates how to estimate the projection of each of the 2 screens in order to determine which one is used to estimate side diffraction, and section (b) illustrates the parameters (distances) used in the estimation of diffraction after determining to use the larger screen 503. The equality in Equation (1) below holds.

$$\theta = \delta - \varphi \quad (1)$$

In order to determine which screen is used to represent the human blocker at any given time instant, depending on the human blocker orientation: if w cos θ<l sin θ, then the larger screen (with dimensions l×h) is used. If w cos θ>l sin θ, then the smaller screen (with dimensions w×h) is used.

Figure 6:
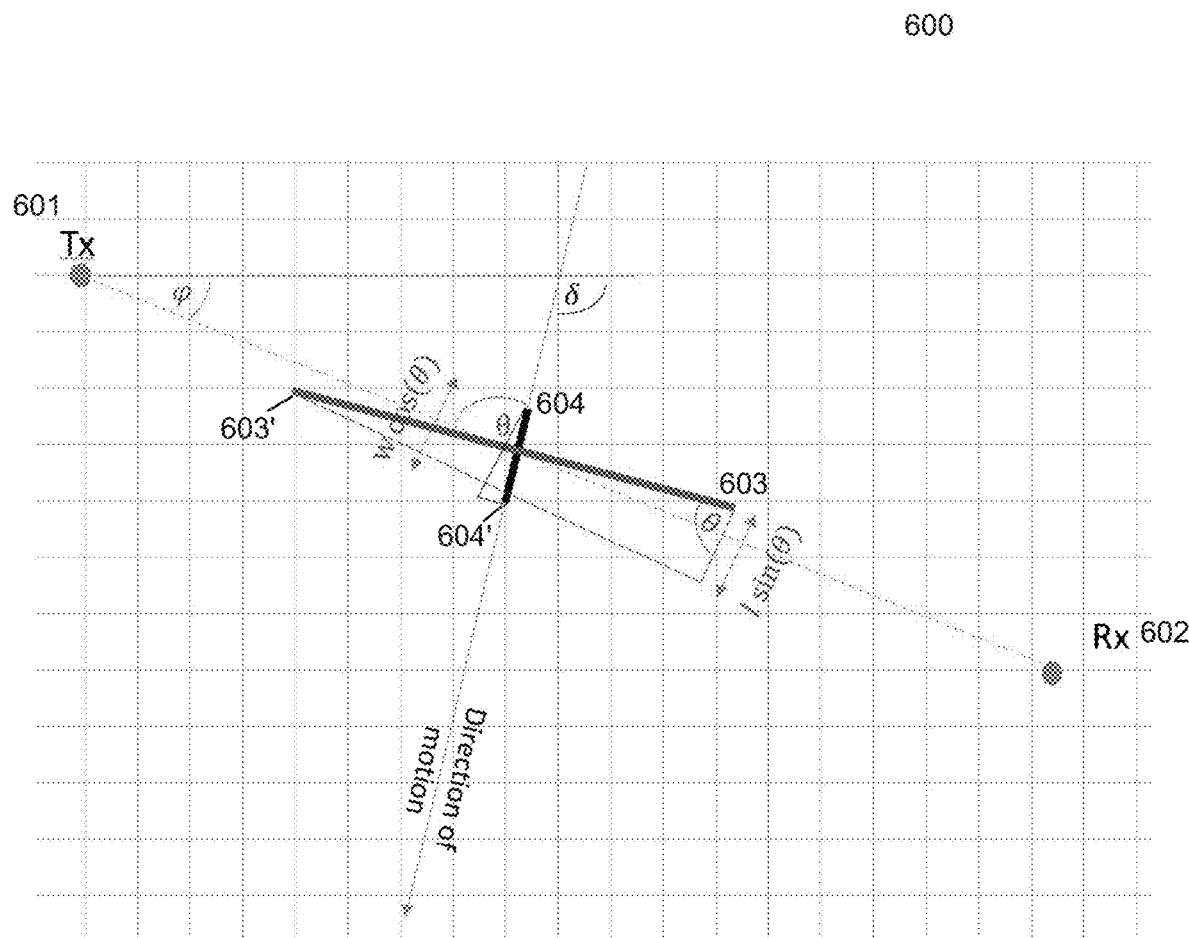
FIG. 6 illustrates a top view for when the side diffraction occurs around the side edges of the smaller screen, according to an embodiment.

FIG. 6 illustrates a top view 600 for when the side diffraction occurs around the side edges 604' of the smaller screen 604, according to an embodiment.

In FIG. 6, the human blocker orientation results in the smaller screen 604 being the one considered in the estimation of side diffraction, instead of the side edges 603' of the larger screen 603.

Figure 7:
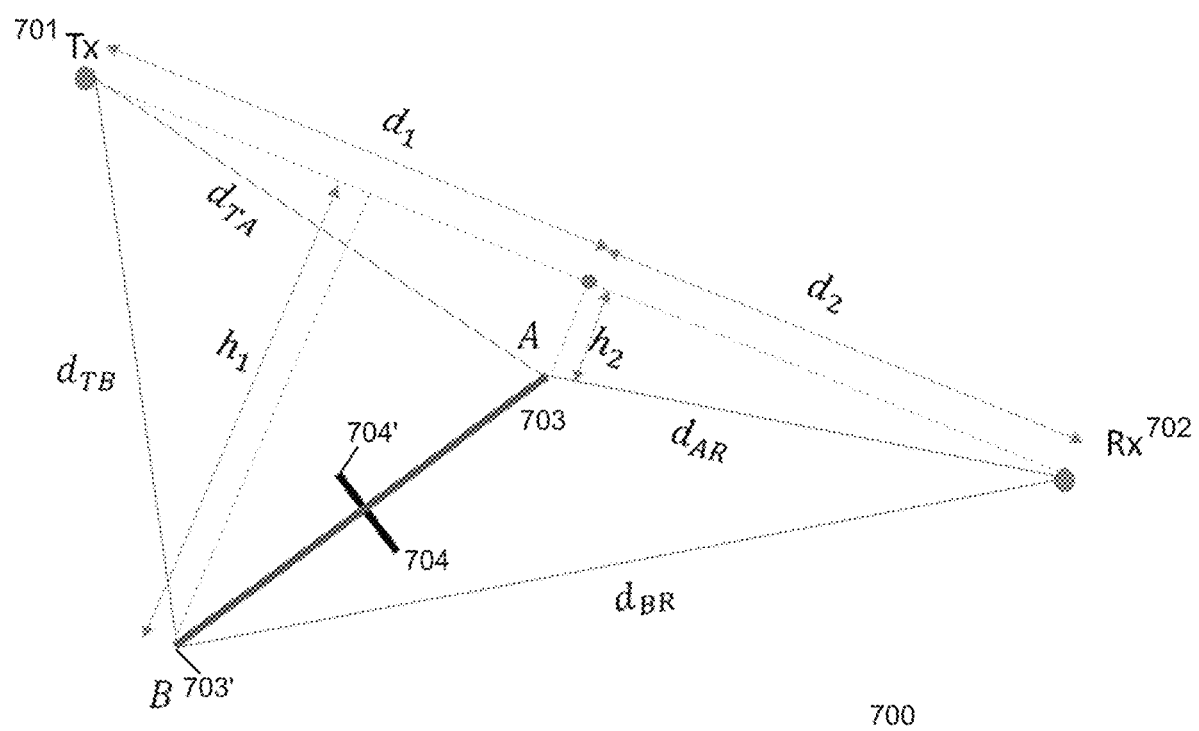
FIG. 7 illustrates a top view showing the geometry when the human blocker is not blocking the Tx-Rx LoS, according to an embodiment.

FIG. 7 illustrates a top view 700 showing the geometry when the human blocker is not blocking the Tx 701-Rx 702 LoS, according to an embodiment. Specifically, FIG. 7 describes the geometry of the scenario when the human blocker is approaching the line of sight but not yet interrupting the line of sight. In this regard, the diffraction of the waves around the human blocker starts when the blocker gets closer to the line of sight, prior to interrupting the line of sight.

ZY' Plane (Side View)

Figure 8:
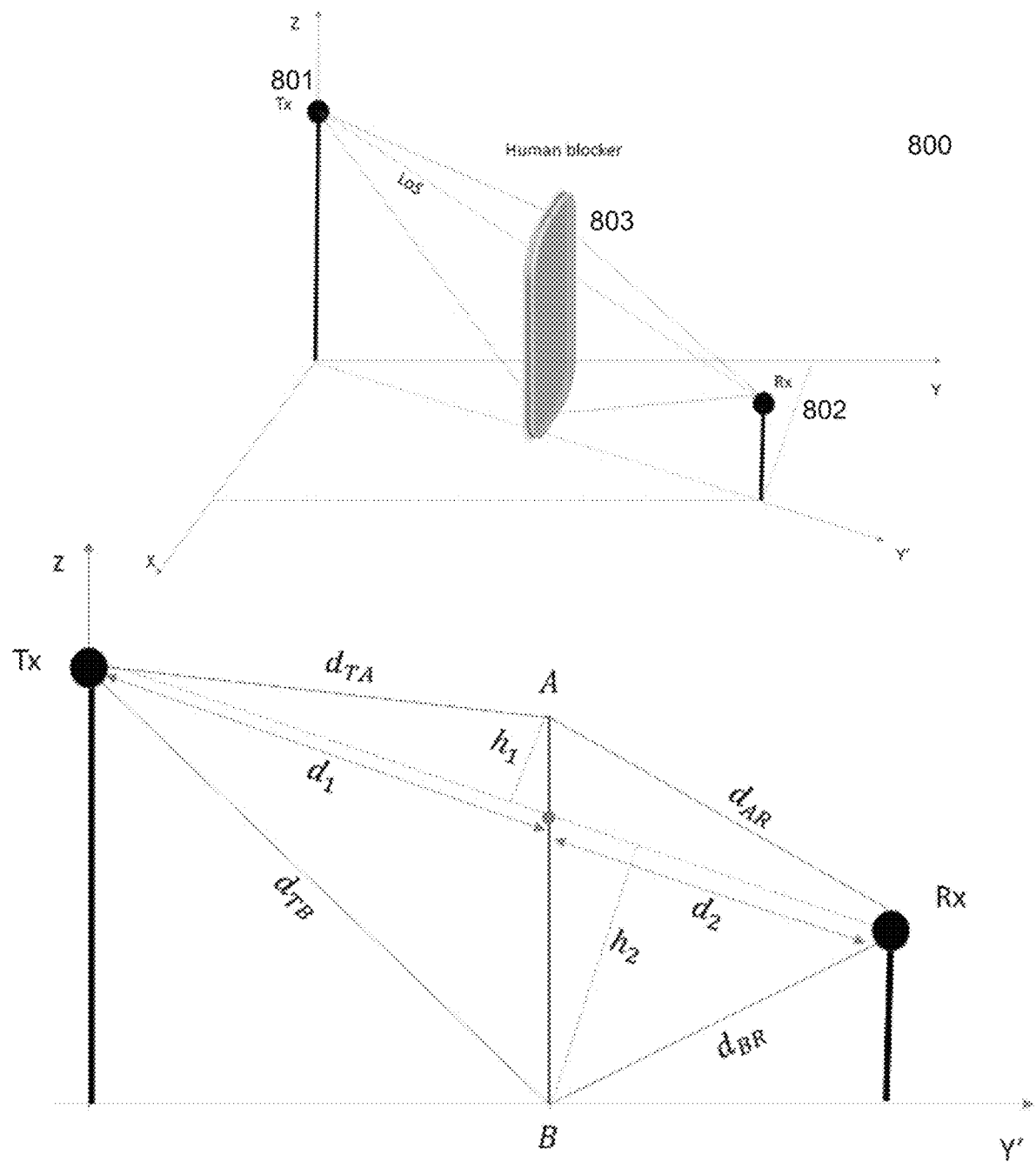
FIG. 8 illustrates a side view of the human blocker blocking the Tx-Rx LoS, according to an embodiment.

FIG. 8 illustrates a side view 800 of the human blocker 803 blocking the Tx 801-Rx 802 LoS, according to an embodiment.

Figure 9:
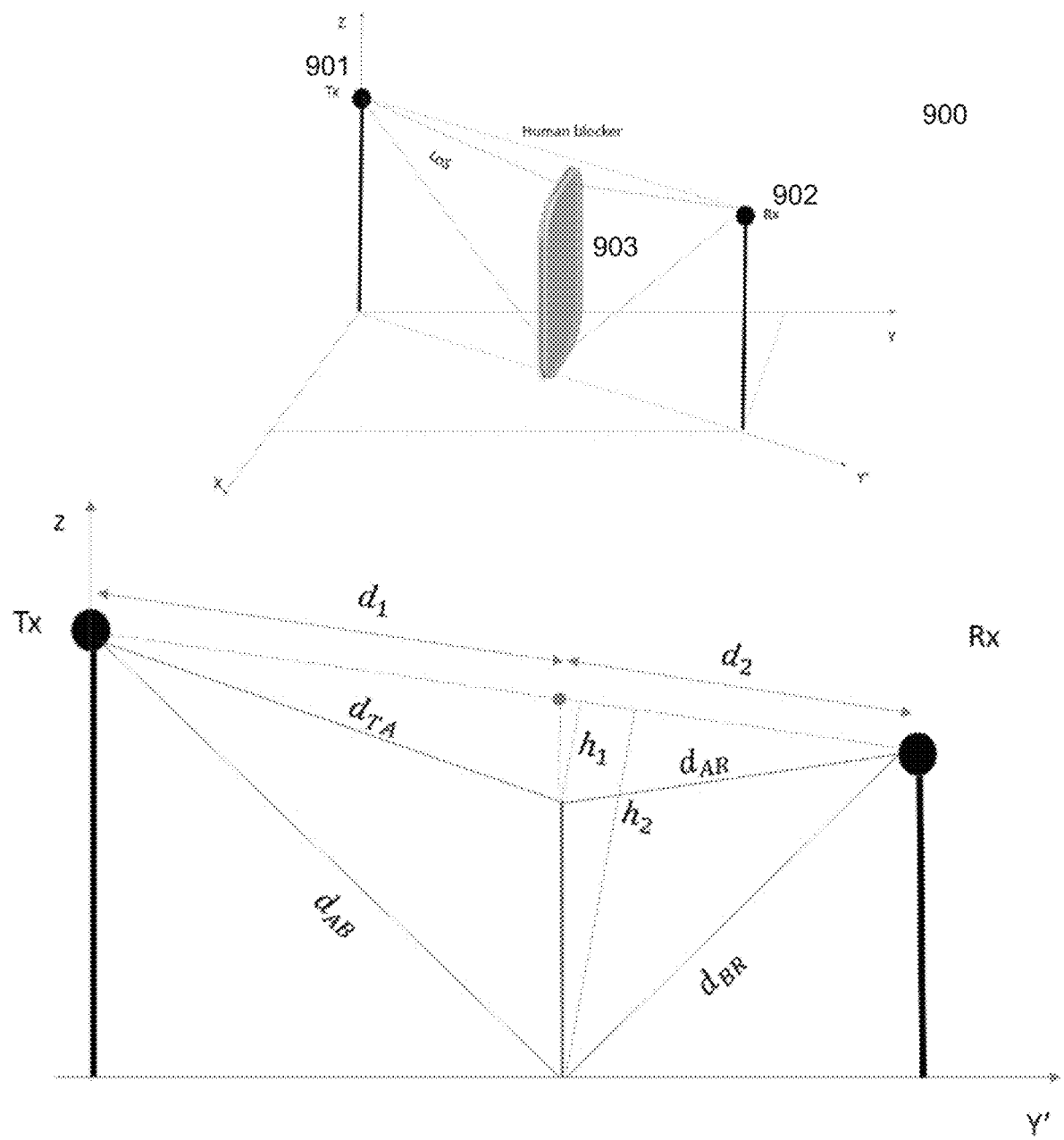
FIG. 9 illustrates a side view of the human blocker not blocking the Tx-Rx LoS, according to an embodiment.

FIG. 9 illustrates a side view 900 of the human blocker 903 not blocking the Tx 901-Rx 902 LoS, according to an embodiment. The following describes the calculation of these instances.

DTMKE Diffraction Equations

Figure 10:
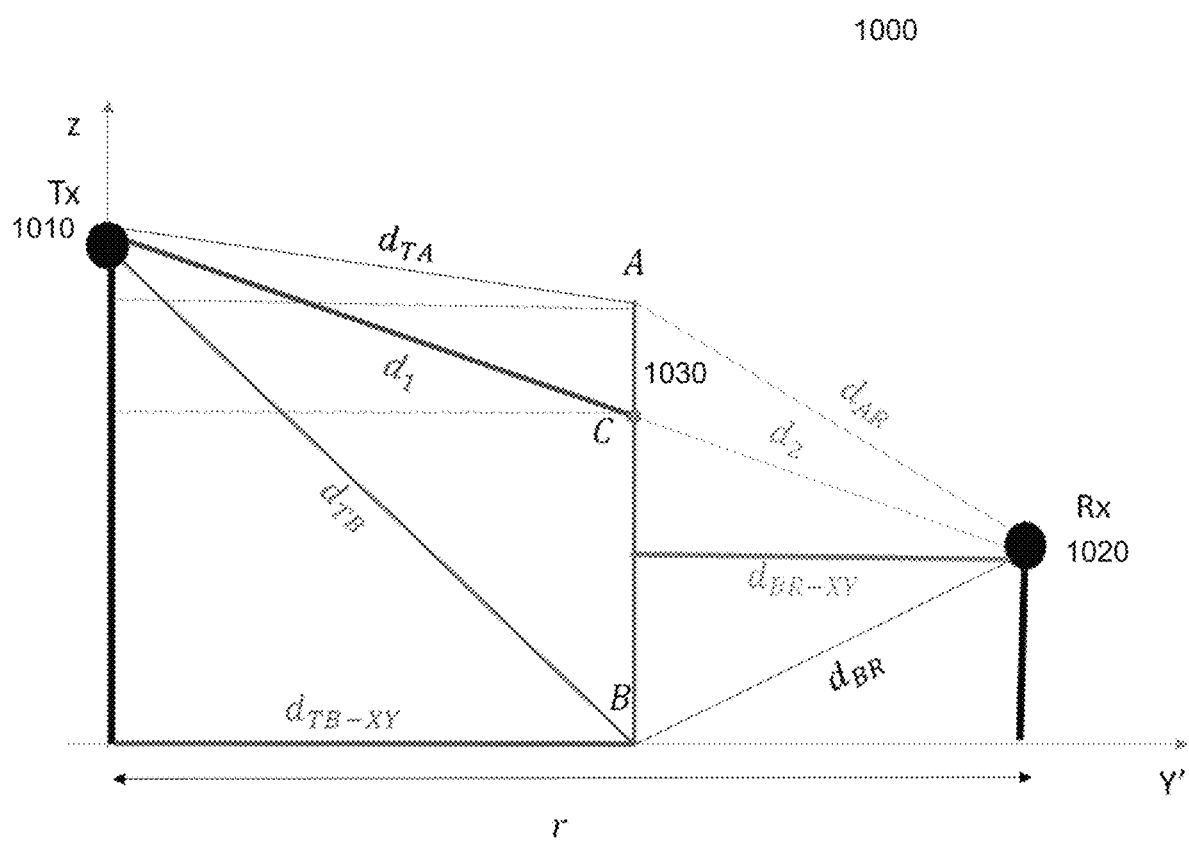
FIG. 10 illustrates a side view of the human blocker, Tx, and Rx with illustrated distances, according to an embodiment.

FIG. 10 illustrates a side view 1000 of the human blocker 1030, Tx 1010 and Rx 1020 with illustrated distances, according to an embodiment.

Figure 11:
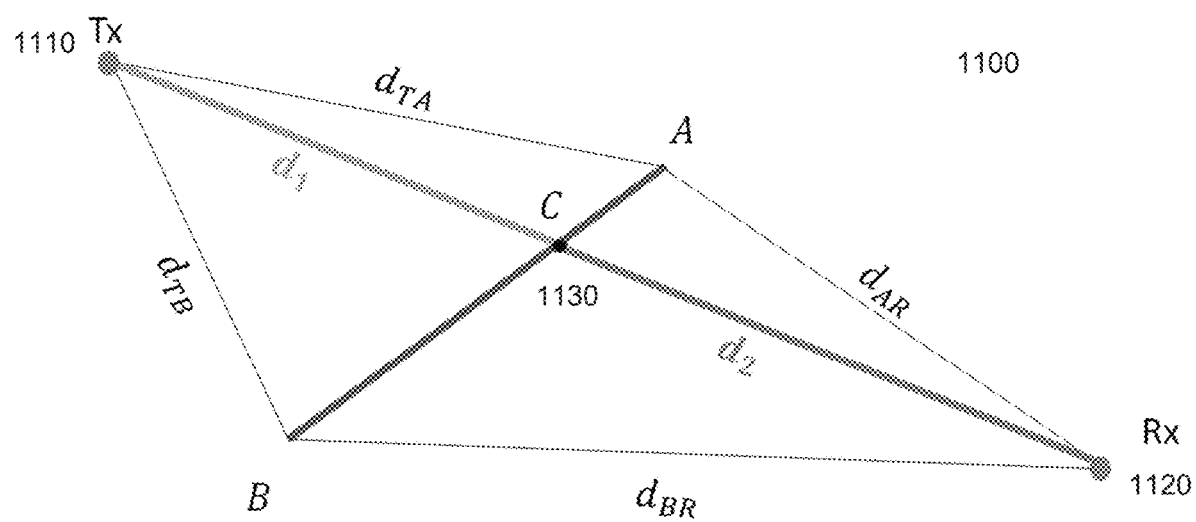
FIG. 11 illustrates a top view of the human blocker, Tx, and Rx with illustrated distances, according to an embodiment.
Figure 12:
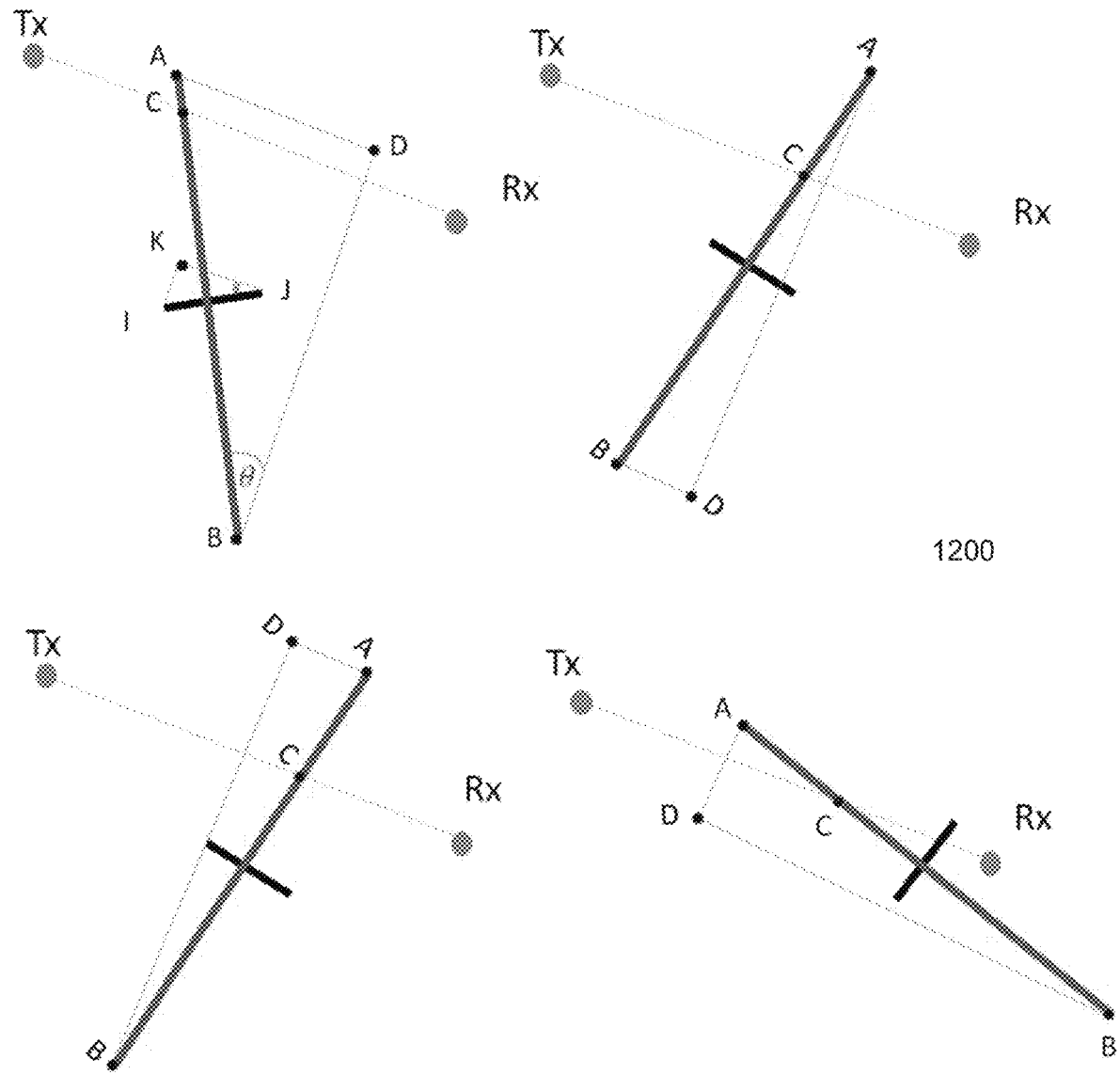
FIG. 12 illustrates a screen projection for different positions, according to an embodiment.

FIG. 11 illustrates a top view 1100 of the human blocker 1130, Tx 1110 and Rx 1120 with illustrated distances, according to an embodiment. FIG. 12 illustrates a screen projection 1200 for different positions, according to an embodiment.

The human blocker is represented by 2 orthogonal absorbing screens and the diffraction occurs at 4 different edges: 2 side edges (see at Tx and Rx in FIGS. 10 and 11) in addition to the top (see A in FIGS. 10 and 11) and bottom edges (see B in FIGS. 10 and 11). For each of those edges, the diffracted electric field intensity is given by E rather than $E_0$ (the un-diffracted field intensity right before the same edge) and assuming far-field conditions ($d_1$, $d_2 \gg \lambda$):

Consider a parameter (v) known as the Fresnel-Kirchoff parameter which is defined to be $$2\sqrt{\frac{\Delta}{\lambda}}$$

where $\Delta$ corresponds to the difference between the length of the diffracted path and the LOS path.

Then, in Equation (2), $$(v) = \frac{1+j}{2}\left\{\left(\frac{1}{2} - C(v)\right) - j\left(\frac{1}{2} - S(v)\right)\right\}E_0 \quad (2)$$

In Equation (2), $C(v)$ and $S(v)$ are the cosine and sine Fresnel integrals given by Equation (3) as follows:

$$C(v) + jS(v) = \int_0^v \exp\left(j\frac{\pi}{2}t^2\right)dt \quad (3)$$

In Equation (3), $$v \approx -h\sqrt{\frac{2}{\lambda}\left(\frac{1}{d_1} + \frac{1}{d_2}\right)}$$

subject to $d_1$, $d_2 \gg h_1$, $h_2$.

Although the above approximation for v is common; the disclosure uses the exact expression for v which can be applied, even when the distances $d_1$, $d_2$ (see FIGS. 9, 10 and 11) are comparable in magnitude to $h_1$, $h_2$, (see FIG. 9), i.e., removing the condition. The following is the derivation of the exact expression for v, taking the diffracted signal at the top edge of the blocker as an example (see FIG. 10).

First, the path difference $\Delta$ between the length of the diffracted path and the length of the LOS path is calculated. Using the geometry shown, $\Delta$ is given by Equation (4) as follows:

$$\Delta = d_{TA} + d_{AR} - (d_1 + d_2) \quad (4)$$

In Equation (4), $d_{TA}$, $d_{AR}$, $d_1$, and $d_2$ (see FIGS. 9, 10, and 11) are given in Table 2 in terms of the locations and dimensions of the Tx, the Rx and the blocker. For convenience and for use in the simulations, different distances required for the diffraction Equations are calculated, and the results are summarized in Table 2 below.

The expression for v is then given by Equation (5) as follows:

$$v_{top} = 2\sqrt{\frac{\Delta}{\lambda}} = 2\sqrt{\frac{d_{TA} + d_{AR} - (d_1 + d_2)}{\lambda}} = 2\sqrt{\frac{d_{TA} + d_{AR} - d}{\lambda}} \quad (5)$$

$$v_{bottom} = 2\sqrt{\frac{\Delta}{\lambda}} = 2\sqrt{\frac{d_{TB} + d_{BR} - (d_1 + d_2)}{\lambda}} = 2\sqrt{\frac{d_{TB} + d_{BR} - d}{\lambda}}$$

In Equation (5), $d = d_1 + d_2$.

Table 2 below provides geometrical estimates of various distances in the diffraction model for top and bottom diffraction.

TABLE 2

| parameter | formula |
|---|---|
| $S_{TxRx-XY}$ (Tx − Rx LoS XY slope) | $\dfrac{y_{Tx} - y_{Rx}}{x_{Tx} - x_{Rx}}$ |
| $S_{bl}$ (blocker screen XY slope) | Given by blocker orientation |
| $x_A, x_B, x_C \equiv x_o$ | $\dfrac{y_{bl} - y_{Tx} + S_{TxRx-XY} x_{Tx} - S_{bl} x}{S_{TxRx-XY} - S_{bl}}$ |
| $y_A, y_B, y_C \equiv y_o$ | $S_{TxRx-XY}(x_A - x_{Tx}) + y_{Tx}$ |
| $z_A$ | Given by blocker height |
| $z_B$ | 0 |
| $z_C$ Obtained by calculating the intersection between the line representing the Tx − Rx LoS and the plane representing the screen/blocker | $n\left(-a - b\left[\dfrac{-ma + y_{Tx} - mx_{Tx}}{1 + mb}\right]\right) - nx_{Tx} + z_{Tx}$ where $n = \dfrac{z_{Rx} - z_{Tx}}{x_{Rx} - x_{Tx}}, m = \dfrac{y_{Rx} - y_{Tx}}{x_{Rx} - x_{Tx}}, b = \dfrac{-1}{S_{bl}}, a = \dfrac{y_o}{S_{bl}} - x_o$ |
| r | $\sqrt{(x_{Tx}-x_{Rx})^2 + (y_{Tx}-y_{Rx})^2}$ |
| $d_{TB-XY}$ | $\sqrt{(x_{Tx}-x_o)^2 + (y_{Tx}-y_o)^2}$ |
| $d_{BR-XY}$ | $r - d_{TB-XY}$ |
| $d_{TA}$ | $\sqrt{(z_{Tx} - z_A)^2 + d_{TB-XY}^2} = \sqrt{(x_{Tx} - x_o)^2 + (y_{Tx} - y_o)^2 + (z_{Tx} - z_A)^2}$ |
| $d_{TB}$ | $\sqrt{(x_{Tx}-x_o)^2 + (y_{Tx}-y_o)^2 + z_{Tx}^2}$ |

TABLE 2-continued

| parameter | formula |
|---|---|
| $d_{AR}$ | $\sqrt{(z_A - z_{Rx})^2 + d_{BR-XY}^2} = \sqrt{(z_A - z_{Rx})^2 + (r - d_{TB-XY})^2}$ |
| $d_{BR}$ | $\sqrt{z_{Rx}^2 + (r - d_{TB-XY})^2}$ |
| $d_1$ | $\sqrt{(x_{Tx} - x_o)^2 + (y_{Tx} - y_o)^2 + (z_{Tx} - z_C)^2}$ |
| $d_2$ | $\sqrt{r^2 + (z_{Tx} - z_{Rx})^2} - d_1$ |
| $d$ | $\sqrt{(x_{Tx} - x_{Rx})^2 + (y_{Tx} - y_{Rx})^2 + (z_{Tx} - z_{Rx})^2}$ |

The un-diffracted field $E_0$ is given by Equation (6) as follows:

$$E_0 = \frac{\lambda}{4\pi(d_1 + d_2)} \exp\left(-j2\pi f \frac{d_1 + d_2}{c}\right) \quad (6)$$

In Equation (6), c is the velocity of light. The total field at the receiver is the total of both diffracted fields from points A and B (see FIGS. 5-8 and 10-12), shown in Equation (7) as follows:

$$E_{total} = E_A \exp\left(-j2\pi f \frac{\Delta d_A}{c}\right) + E_B \exp\left(-j2\pi f \frac{\Delta d_B}{c}\right) \quad (7)$$

In Equation (7) $\Delta d_A = d_{TA} + d_{AR} - d_1 - d_2$, and $\Delta d_B = d_{TB} + d_{BR} - d_1 - d_2$ are the extra propagation distances of the 2 diffracted paths compared to the LoS.

Table 3 below provides geometrical estimates of various distances in the diffraction model for side diffraction.

TABLE 3

| parameter | formula |
|---|---|
| $S_{TxRx-XY}$ (Tx − Rx LoS XY slope) | $\dfrac{y_{Tx} - y_{Rx}}{x_{Tx} - x_{Rx}}$ |
| $S_{bl}$ (blocker screen XY slope) | Given by blocker orientation |
| $z_C$ Obtained by calculating the intersection between the line representing the Tx − Rx LoS and the plane representing the screen/blocker | $n\left(-a - b\left[\dfrac{-ma + y_{Tx} - mx_{Tx}}{1 + mb}\right]\right) - nx_{Tx} + z_{Tx}$ where $n = \dfrac{z_{Rx} - z_{Tx}}{x_{Rx} - x_{Tx}}$, $m = \dfrac{y_{Rx} - y_{Tx}}{x_{Rx} - x_{Tx}}$, $b = \dfrac{-1}{S_{bl}}$, $a = \dfrac{y_o}{S_{bl}} - x_o$ |
| $z_A$ | $z_C$ |
| $z_B$ | $z_C$ |
| $x_A$ | $x_{bl} + \dfrac{1}{2}\dfrac{L}{\sqrt{S_{bl}^2 + 1}}$ |
| $y_A$ | $y_{bl} + \dfrac{S_{bl}}{2}\dfrac{L}{\sqrt{S_{bl}^2 + 1}}$ |
| $x_B$ | $x_{bl} - \dfrac{1}{2}\dfrac{L}{\sqrt{S_{bl}^2 + 1}}$ |
| $y_B$ | $y_{bl} - \dfrac{S_{bl}}{2}\dfrac{L}{\sqrt{S_{bl}^2 + 1}}$ |
| $x_C$ | $\dfrac{y_{bl} - y_{Tx} + S_{TxRx-XY} x_{Tx} - S_{bl} x_{bl}}{S_{TxRx-XY} - S_{bl}}$ |
| $y_C$ | $S_{TxRx-XY}(x_C - x_{Tx}) + y_{Tx}$ |
| $d$ | $\sqrt{(x_{Tx} - x_{Rx})^2 + (y_{Tx} - y_{Rx})^2 + (z_{Tx} - z_{Rx})^2}$ |
| $d_{TA}$ | $\sqrt{(x_{Tx} - x_A)^2 + (y_{Tx} - y_A)^2 + (z_{Tx} - z_A)^2}$ |
| $d_{TB}$ | $\sqrt{(x_{Tx} - x_B)^2 + (y_{Tx} - y_B)^2 + (z_{Tx} - z_B)^2}$ |
| $d_{AR}$ | $\sqrt{(x_{Rx} - x_A)^2 + (y_{Rx} - y_A)^2 + (z_{Rx} - z_A)^2}$ |
| $d_{BR}$ | $\sqrt{(x_{Rx} - x_B)^2 + (y_{Rx} - y_B)^2 + (z_{Rx} - z_B)^2}$ |
| $d_1$ | $\sqrt{(x_{Tx} - x_C)^2 + (y_{Tx} - y_C)^2 + (z_{Tx} - z_C)^2}$ |
| $d_2$ | $\sqrt{(x_{Rx} - x_C)^2 + (y_{Rx} - y_C)^2 + (z_{Rx} - z_C)^2}$ |

For simulation purposes, projections of both screens orthogonal to the LoS are estimated. The screens represent the human blocker. The following steps are performed.

1. Find point D location ($x_D$ and $y_D$) through the intersection of a line passing through A parallel to the LoS and a line passing through B orthogonal to the LoS. Note that A and B can be switched without changing the result.

The Equation of the line passing through A and parallel to the LoS is given by Equation (8) below:

$$y - y_A = S_{TxRx-XY}(x - x_A) \tag{8}$$

Equation (9) below gives the line passing through B and orthogonal to the LoS.

$$y - y_B = -\frac{1}{S_{TxRx-XY}}(x - x_B) \tag{9}$$

Solving both Equations (8) and (9) to find the intersection point D (see FIG. 12), results in Equation (10) as follows:

$$x_D = \frac{\left(\frac{1}{S_{TxRx-XY}}\right)x_B + y_B + S_{TxRx-XY}x_A - y_A}{S_{TxRx-XY} + \left(\frac{1}{S_{TxRx-XY}}\right)} \tag{10}$$

$$y_D = S_{TxRx-XY}x_D - S_{TxRx-XY}x_A + y_A$$

2. Find the length of the line between D (see FIG. 12) and the point from which the orthogonal line passes (see the length of BD in FIG. 12) using Equation (11) as follows:

$$BD = \sqrt{(x_B - x_D)^2 + (y_B - y_D)^2} \tag{11}$$

3. The angle θ is calculated using Equation (12) as follows:

$$\theta = \arcsin\left(\frac{BD}{AB}\right) \tag{12}$$

4. The projection IK (see FIG. 12) of the other screen is calculated using Equation (13) as follows:

$$IK = IJ \cos(\theta) \tag{13}$$

Human Blockage Prediction

Figure 13:
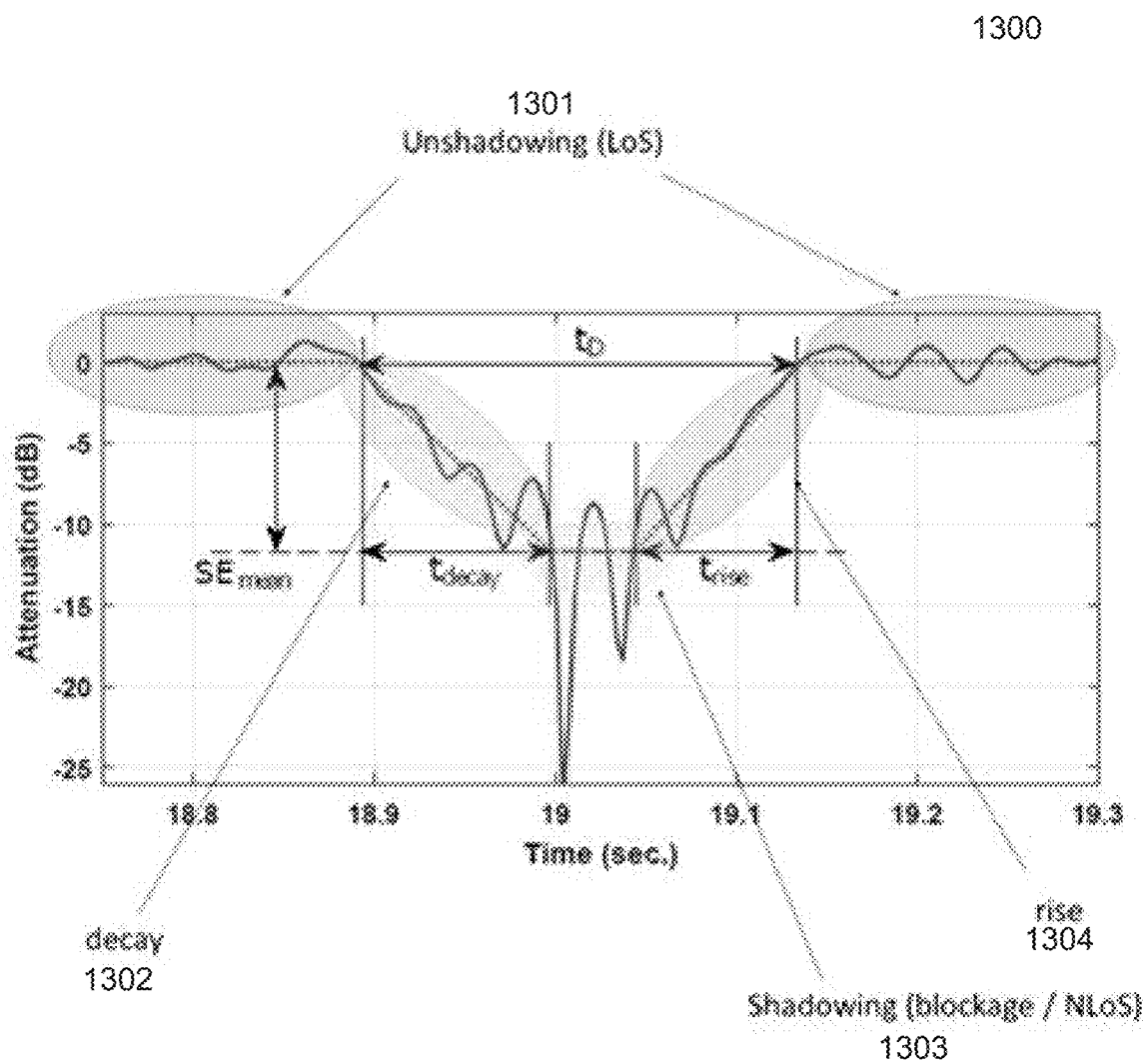
FIG. 13 illustrates stages of a blockage event, according to an embodiment.

FIG. 13 illustrates stages 1300 of a blockage event, according to an embodiment.

As mentioned above, accurate prediction of a blockage event is advantageous for the purpose of an HO and CHO.

Based on measurement data, a blockage event can be divided into either shadowing (blockage) and unshadowing, or decay 1302, shadowing (blockage) 1303, rise 1304 and unshadowing 1301, Consequently, a 2-state model or a 4-state model may be developed. The 4-state model is illustrated in FIG. 13.

Predicting a blockage event is performed by correctly predicting the shadowing 1303 state at least one time sample ahead.

For prediction, several prediction methods were investigated and evaluated through simulation. All of the methods are learning-based, including the auto-regressive moving-average (ARMA) model with different variants. This model and its evaluation are excluded from this application due to modest results.

The main methods used are learning-based AI models including LSTM and fully connected DNNs.

Figure 14:
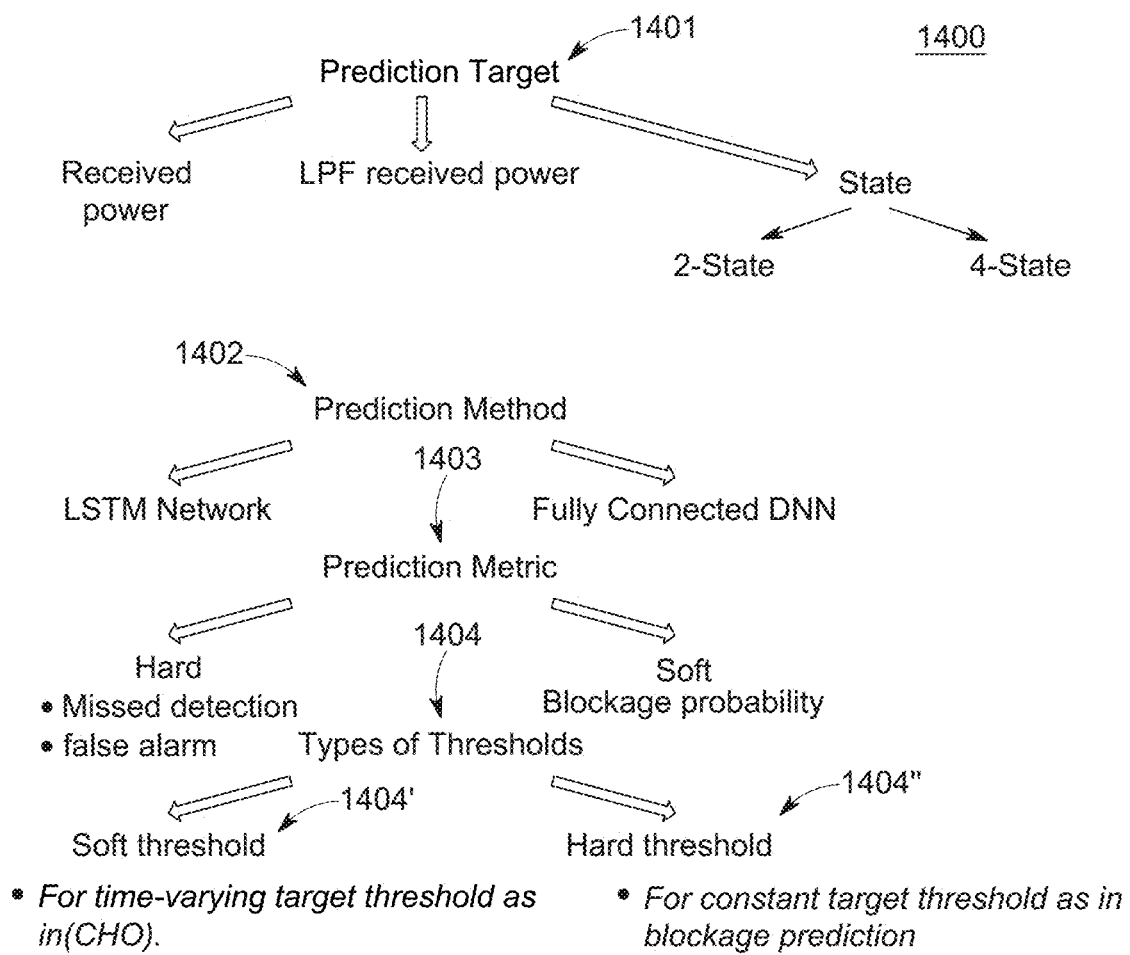
FIG. 14 illustrates a classification of different aspects of prediction, according to an embodiment.

FIG. 14 illustrates a classification 1400 of different aspects of prediction, according to an embodiment. Specifically, FIG. 14 illustrates the different prediction methods investigated as well as a classification of the different aspects of the prediction process, such as the prediction target 1401, metric 1403 and thresholds 1404.

Prediction Target (1401)

A prediction target 1401 can be:
1. Future samples of the received signal power;
2. A low-pass-filtered version of the current or future samples of the received signal power (LPF is a 7-tap FIR filter with the following impulse response: [0.05, 0.1, 0.2, 0.3, 0.2, 0.1, 0.05]); or
3. The future system state:
   2 states: unshadowing/shadowing, or
   4 states: decay/shadowing/rise/unshadowing (see FIG. 13)

Figure 15:
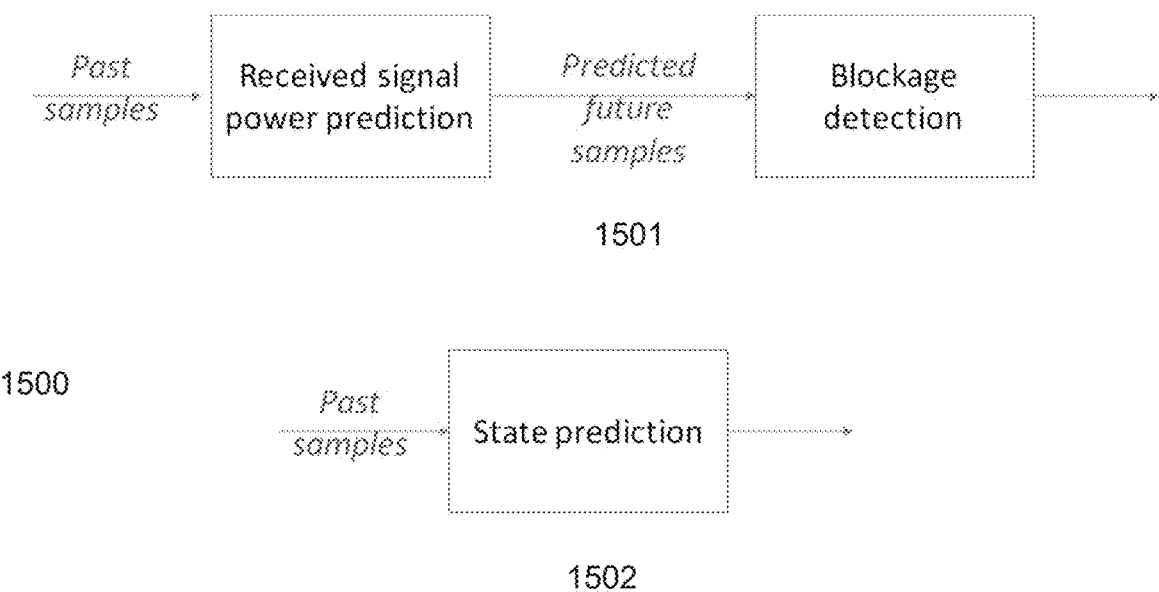
FIG. 15 illustrates one-step vs. two-step blockage prediction, according to an embodiment.

FIG. 15 illustrates one-step 1502 vs. two-step 1501 blockage prediction 1500, according to an embodiment.

Referring to FIGS. 14 and 15, the end goal in all of the above prediction target 1401 cases is to correctly predict the blockage event. Thus, in the first two cases where the received signal power is predicted, an additional step is needed that processes the received signal power and detects whether a blockage will occur. This is described in reference to FIG. 15, which provides one-step 1502 vs. two-step 1501 blockage prediction.

Figure 16:
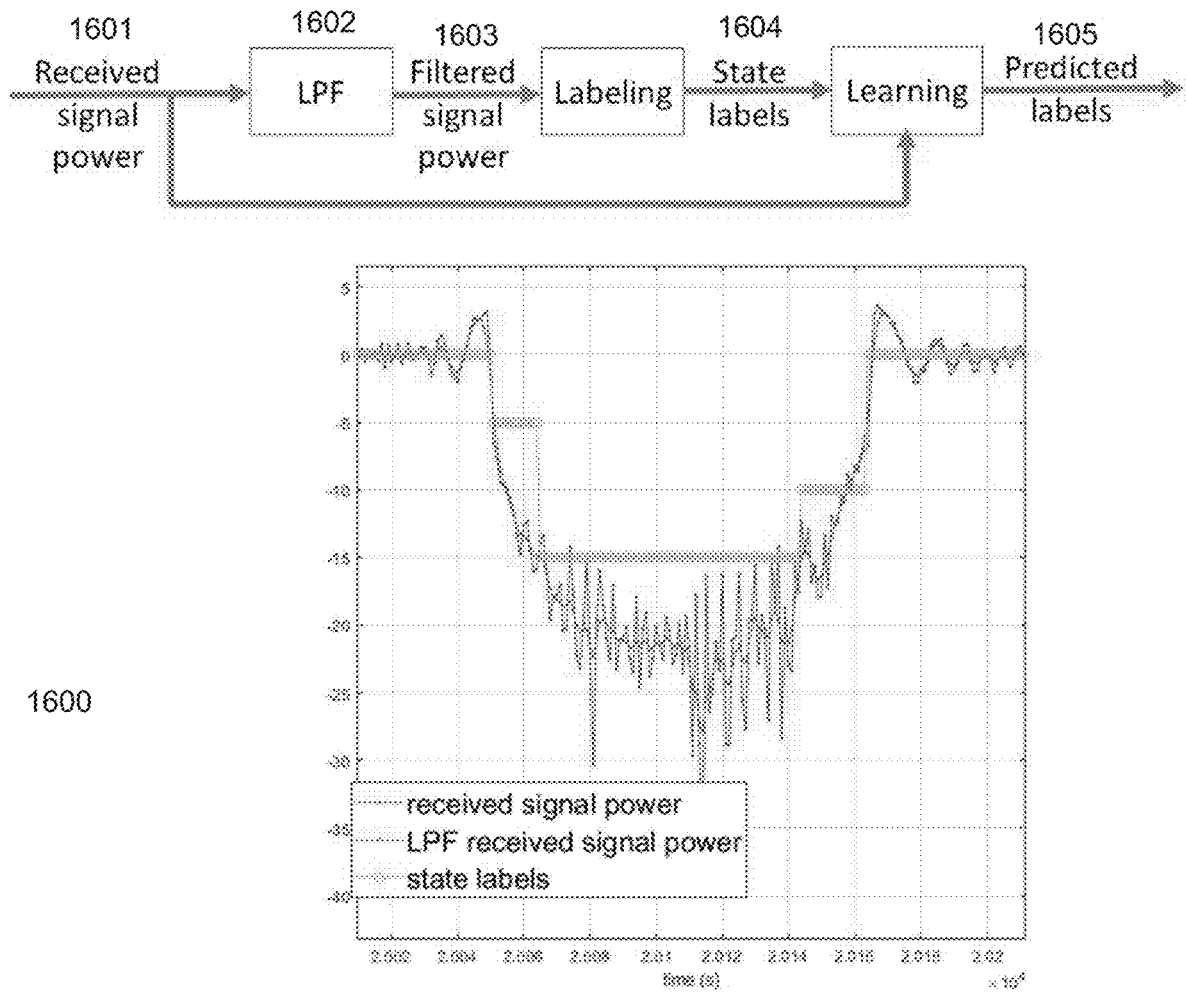
FIG. 16 illustrates 3 prediction targets and their dependencies, according to an embodiment.

FIG. 16 illustrates three prediction targets and their dependencies 1600, according to an embodiment.

Specifically, it is noted that each one of the prediction targets 1401 listed above in reference to FIG. 14 requires the previous targets to be generated as well. This is illustrated in FIG. 16, where the state labels 1604 and the predicted labels 1605 are estimated from the filtered signal power 1603 output from the LPF-signal 1602, which in turn is based on the original received signal power 1601.

Prediction Method (1402)

Figure 17:
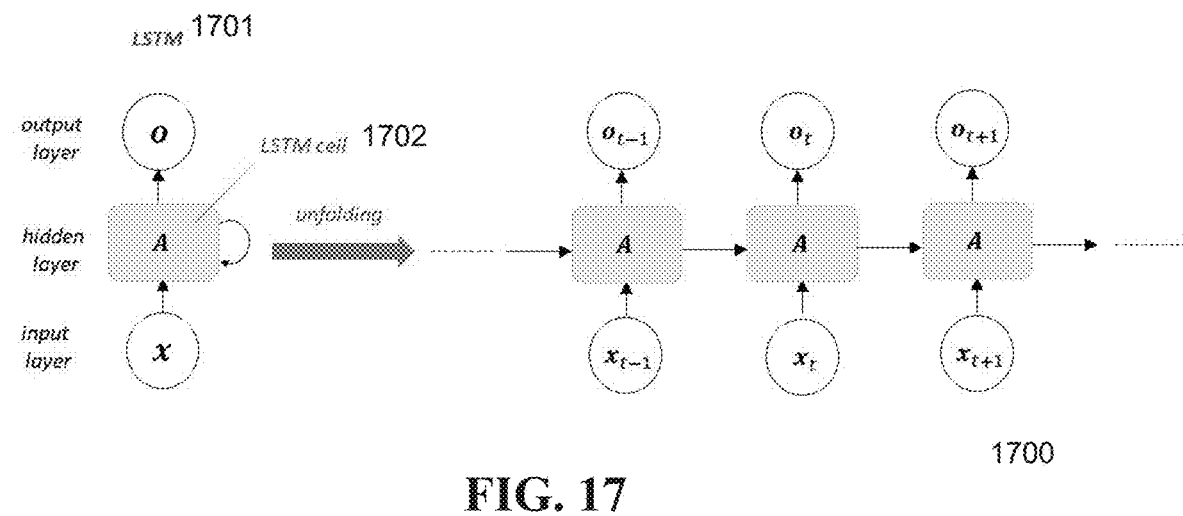
FIG. 17 illustrates a block diagram of LSTM, according to an embodiment.

FIG. 17 illustrates a block diagram 1700 of LSTM 1701, according to an embodiment.

In particular, LSTM 1701 is a type of machine learning (ML) network that is particularly suited for time-series prediction. In the LSTM 1701 network shown in FIG. 18. The main distinguishing feature of LSTM compared to other ML networks is the presence of an LSTM cell 1702 that feeds back its internal states on itself while simultaneously accepting new input, as shown.

Figure 18:
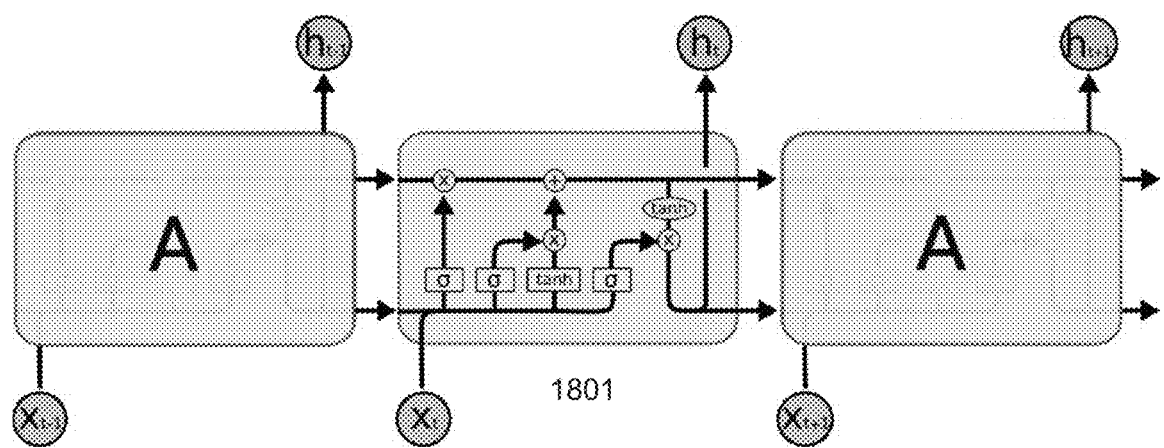
FIG. 18 illustrates an inside of one LSTM cell which contains four interacting layers, according to an embodiment.

FIG. 18 illustrates an inside of one LSTM cell 1801 which contains four interacting layers, according to an embodiment. The LSTM cell 1801 exists among three LSTM cells 1800 in FIG. 18. A main aspect of LSTM is the ability to selectively identify irrelevant previous inputs and states, disregard them and replace them with new input and new states as needed.

The internal configuration of the LSTM cell 1801 illustrates four interacting layers, as shown.

Figure 19:
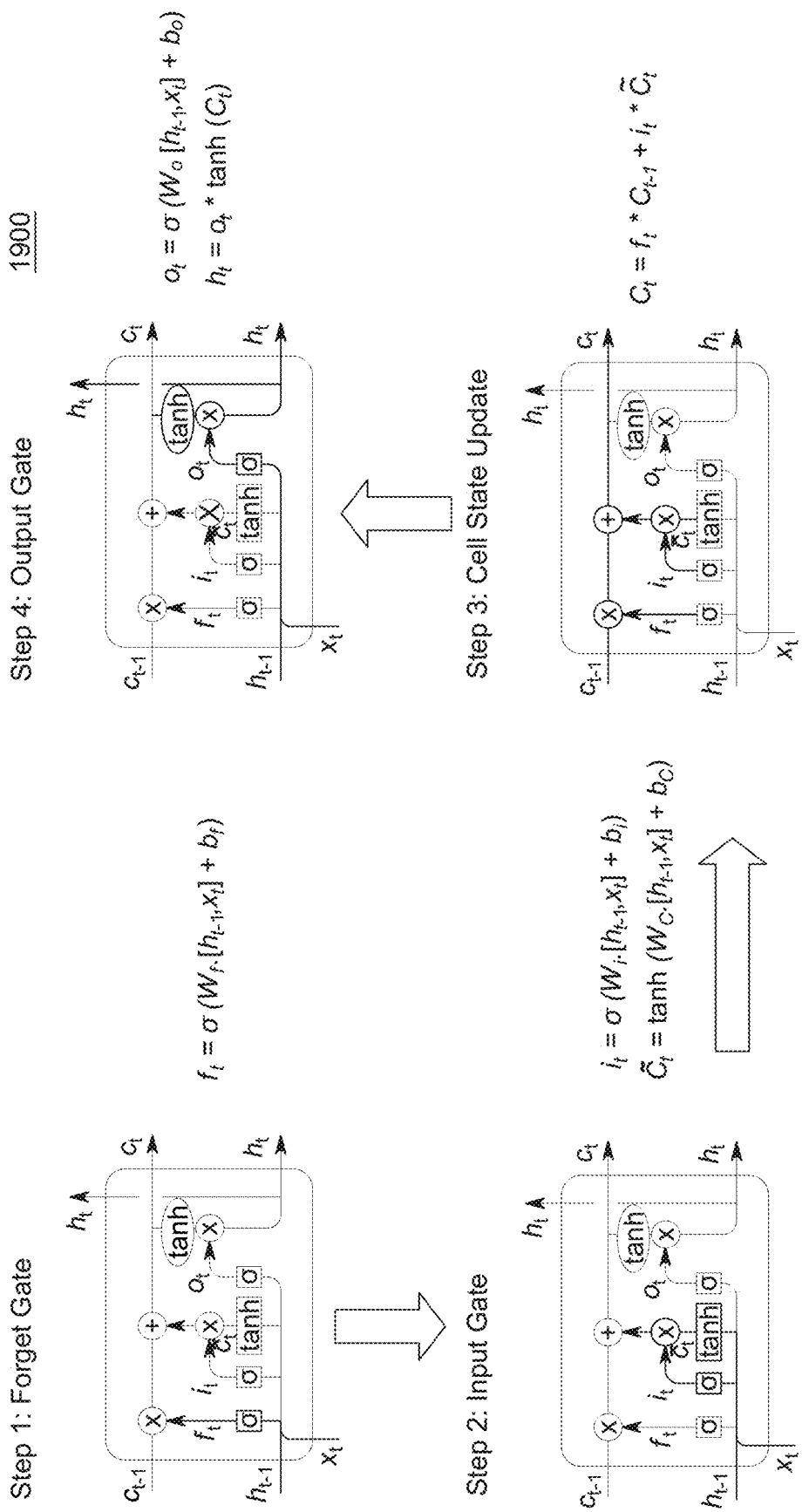
FIG. 19 illustrates an LSTM operation summary, according to an embodiment.

FIG. 19 presents a summary 1900 of the LSTM operation, according to an embodiment. In particular, the summary 1900 in FIG. 19 is illustrated with the associated system Equations.

Figure 20:
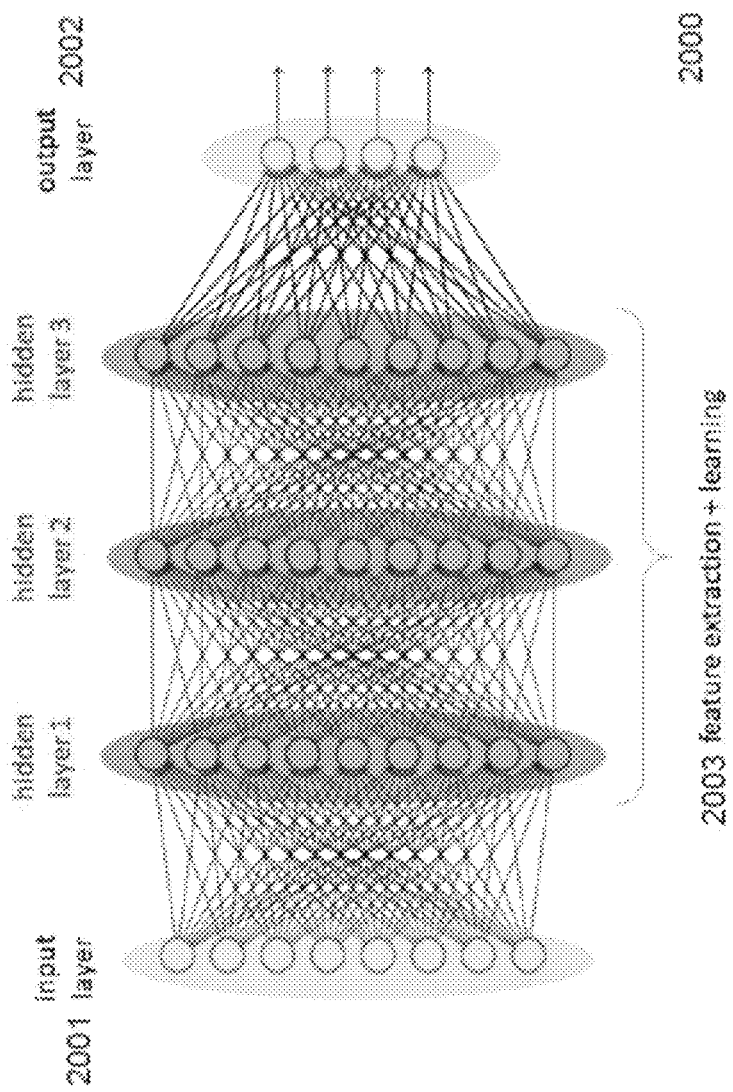
FIG. 20 illustrates a deep neural network (DNN), according to an embodiment.

FIG. 20 illustrates a DNN 2000, according to an embodiment.

Aside from LSTM, fully-connected DNNs have been attempted for human blockage prediction. A general structure for a DNN 2000 is shown in FIG. 20, where the DNN 2000 includes an input layer, an output layer, and a plurality of hidden layers 2003 where feature extraction in addition to learning occurs.

Figure 21:
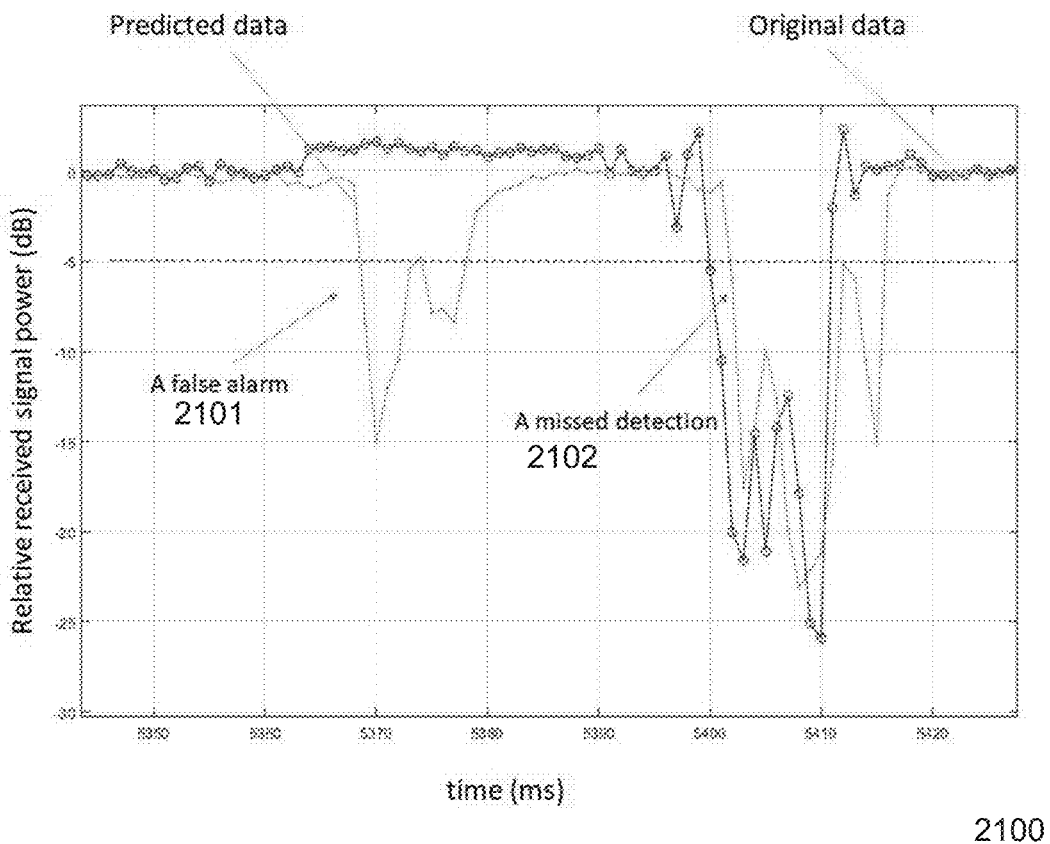
FIG. 21 illustrates false alarm and missed detection concepts, according to an embodiment.

FIG. 21 is a graph 2100 illustrating false alarm 2101 and missed detection 2102 concepts, according to an embodiment. In FIG. 21, and referring back to FIG. 14, depending on the application that needs blockage prediction, the prediction metric (prediction) 1403 can be either hard or soft.

1. Hard Metric:

In this case, the algorithm predicts whether or not a blockage will occur in a 1/0 type of metric. For the hard metric, the algorithm performance can be evaluated through estimating the missed detection 2102 and false alarm 2101 rate.

A false alarm 2101 event is defined through introduction of a tolerance period. If the blockage is predicted within the tolerance period after the detection of a blockage event, it is NOT counted as a false alarm 2101 since it occurs during an ongoing blockage event. The detection of a blockage event is based on actual measurements and not future predictions. FIG. 21 illustrates the difference between a false alarm 2101 and missed detection 2101.

2. Soft Metric:

In this case, the output of the prediction algorithm is a soft value between 0 and 1 and represents the probability that a blockage will occur. A threshold can be used to obtain a hard metric from the soft metric. Alternatively, a soft metric can be further processed (possibly with previous metric values) in order to obtain a more reliable hard metric. The output of the blockage prediction algorithm determines whether to trigger the CHO procedure.

As seen in FIG. 14, two different types of thresholds 1404 can be used, namely, soft 1404' and hard 1404" thresholds. The details of each of these types of thresholds are provided in FIG. 14.

Simulations
Simulation Setup

An indoor environment was simulated with a fixed distance=5 m between the Tx and the Rx. The Rx height is fixed at 1.4 m and the Tx height varied in different simulations. A human blocker crossed the LoS between the Tx and the Rx at different crossing points (distance from the Tx at crossing the LoS), and with different orientations (angle of mobility).

Figure 22:
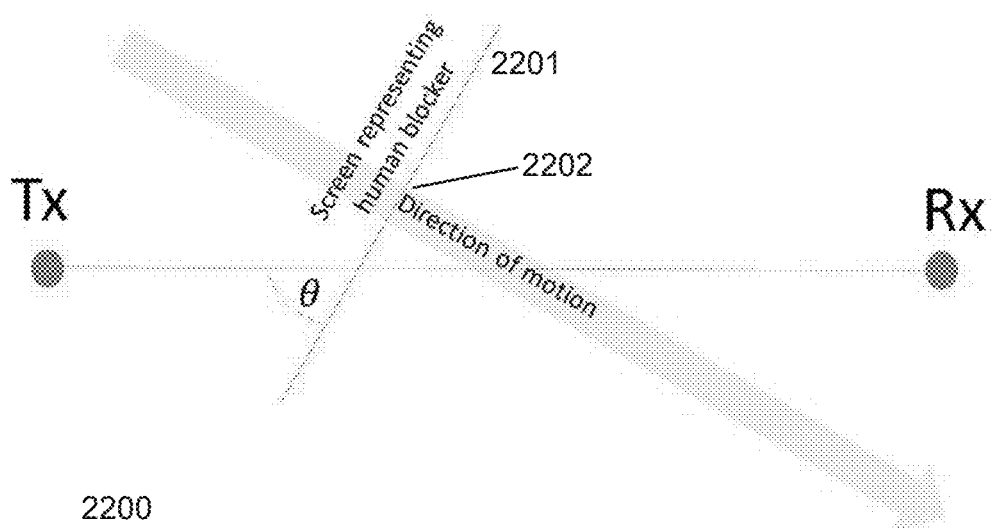
FIG. 22 illustrates a top view of the simulated environment, according to an embodiment.
Figure 23:
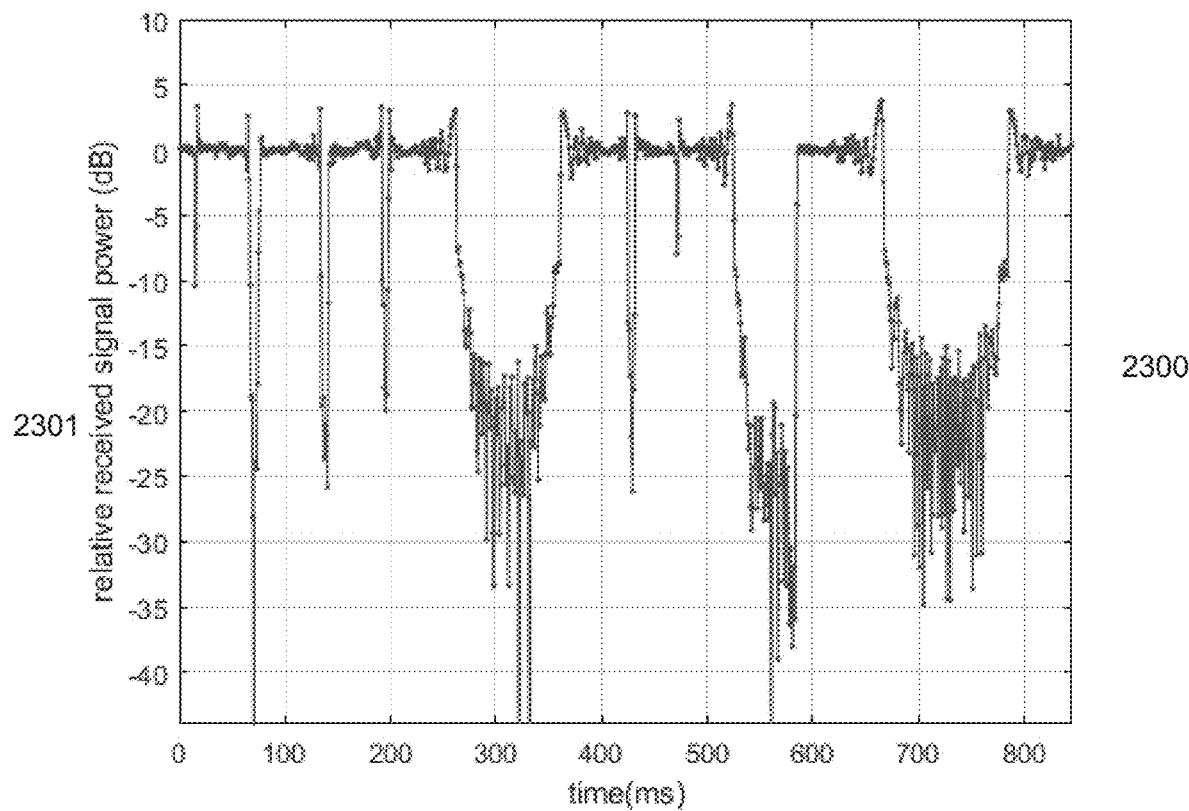
FIG. 23 is a graph illustrating an example of the received signal power generated by the model with blockage events that vary in intensity and duration, according to an embodiment.
Figure 24:
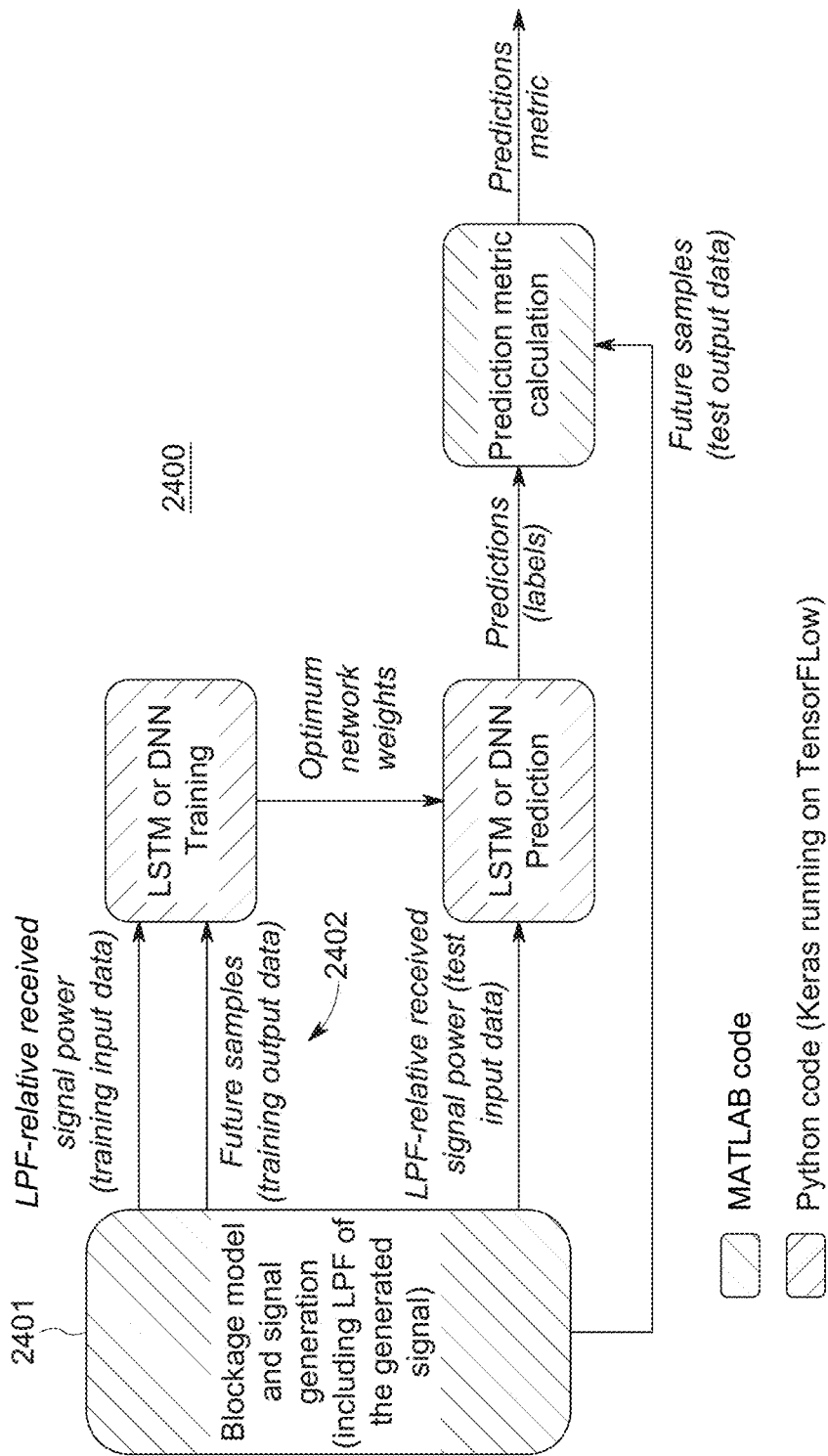
FIG. 24 illustrates simulation organization, according to an embodiment.

FIG. 22 illustrates a top view of the simulated environment 2200, according to an embodiment. FIG. 23 is a graph 2300 illustrating an example of the received signal power generated by the model with blockage events that vary in intensity and duration, according to an embodiment. FIG. 24 illustrates simulation organization 2400, according to an embodiment.

In particular, FIG. 22 illustrates a top view of the simulation environment 2200 with an example of the blocker 2201 orientation and crossing point 2202.

Generally, in FIG. 24, a physical/geometrical model 2401 is used to simulate the LoS THz channel, human blocker and an indoor scenario where the human blocker moves to intercept the LoS channel. Diffraction laws are used to estimate the received signal power 2402. Thresholds are applied to the received signal power 2402 to classify the signal state (unshadowing, decay, shadowing, and rise) and label the generated data. The received signal power along with the future labeled channel states (5 future states) are fed into an LSTM network 2403 for training. The outputs of this training phase are the optimum LSTM network weights.

In more detail, the simulation steps illustrated in FIG. 24 areas follows.

1. The simulation first generates, in a blockage model 2401, the received signal power 2402 for many blockage events with a random blocker orientation and crossing point for each blockage event. FIG. 23 illustrates an example of the relative received signal power 2301 in decibels (dBs) where 0 dB represents the highest received power.

One sample of the received signal power is generated each 1 ms.

2. Based on the prediction target (LPF version or labels), the prediction target 2403 is then generated from the low-pass-filtered received signal power 2301, 2402. Both steps 1 and 2 may be performed in matrix laboratory (MATLAB). The prediction target may use the past and present samples/values of the LPF received signal power in order to either predict the future values of the same LPF received power or predict the labels (i.e., channel states).

3. As seen in FIG. 24, both the LPF relative received signal power 2402 and the prediction target are then given as inputs to an LSTM or DNN network for training. This is proceeded by a testing step in which the optimum network weights obtained from the training step along with the test data are given as inputs to the optimum LSTM or DNN network for testing. Both the training and testing step use a python code that uses the Keras library which runs on TensorFLow. Note that the generated data is down sampled prior to being used for learning or testing. The main final sample rate used in the simulations is one sample every 10 ms. However, other sampling rates have been tested, such as 1 sample every 5 or every 20 ms.

4. The prediction output from the python code is then given as input to a MATLAB code that also takes the actual data as an input and then generates the prediction metric.

Relative Received Signal Power Prediction Results

In the method of FIG. 24, the output of an LSTM predictor is the future LPF relative received signal power. Several N future samples are predicted at each time instant. For example, if N=5, then 5 samples into the future are predicted at each time instant. The predicted values are then jointly processed through a MATLAB algorithm to obtain one final predicted value only for the next time sample ahead. Different algorithms will be explained below.

This method uses the prediction target as the LPF relative received signal power which is then compared with preset thresholds in order to determine whether a blockage event is predicted. The performance results of this method were found to perform the method that directly predicts the state (decay/shadowing/rise/unshadowing). The following is one example simulation result of this method.

Prediction target: LPF relative received signal power
Prediction methods:
Prediction metric: hard metric: missed detection and false alarm
Prediction time advance: N samples Different LSTM network configurations have been simulated. Table 4 below presents the results of one example, i.e., for relative received power. In this example, N=5, i.e., 5 samples are predicted into the future. Each row in the table represents the results using only a certain number of predicted future samples. The first row illustrates results of using only 1 future sample, the second row illustrates using 2 future samples, etc.

In other words, predicting N future samples at each current sample indicates that there are N resulting versions of the received signal power. The first version is expected to be the most accurate since it is the result of predicting one step into the future.

TABLE 4

| Missed Detection by Step | False Alarm by Step | Missed Detection by Confirmation | Looser Missed Detection by Confirmation | False Alarm by Confirmation | Missed Detection Any | Looser Missed Detection Any | False Alarm Any |
|---|---|---|---|---|---|---|---|
| 0.3864 | 0.0152 | 0.3864 | 0.1742 | 0.0152 | 0.2879 | 0.1288 | 0.7727 |
| 0.5303 | 0.0379 | 0.5758 | 0.4394 | 0.0152 | 0.4621 | 0.1364 | 0.3258 |
| 0.6136 | 0.0606 | 0.6894 | 0.5909 | 0.0076 | 0.5833 | 0.1970 | 0.0227 |
| 0.6894 | 0.0606 | 0.8030 | 0.7424 | 0.0076 | 0.7652 | 0.5985 | 0.0076 |
| 0.7424 | 0.0530 | 0.8636 | 0.8333 | 0 | 0.8636 | 0.8333 | 0 |

In Table 4:
by step: when a specific future sample is used for prediction. For example: row 4 illustrates the results if the prediction of each sample is performed 4 steps prior.
by confirmation: when a blockage event is predicted only when ALL the first "n" sample predictions predict blockage. For example, row 4 gives the results when a blockage event is predicted if all of the first 4 versions of the predicted received power predict a blockage.
Looser missed detection by confirmation: This is when any "n" samples predict a blockage and not necessarily the first n.
any: This occurs when ANY n samples predict a blockage.

4-State Labels Prediction Results

The following group of results is for the following:
Prediction target: 4-state labels (unshadowing, decay, shadowing, and rise).
Prediction methods: both LSTM and fully-connected DNN
Predication metric: soil metric: each time sample is associated with 4 probabilities for the 4 states. For the purpose of obtaining a final decision on the state label, we further use a hard decision which selects the predicted label with the highest probability as the final predicted label. Note that other more sophisticated methods could result in better decisions. For example, methods that use the soft outputs of several previous consecutive samples to obtain one final decision for the current sample.
prediction time advance: 1 time sample into the future.

Table 5 below illustrates the prediction results for 4-state labels, i.e., for 5 LSTM and 2 DNN predictors (classifiers).

TABLE 5

| | Test Data | | Training Data | |
|---|---|---|---|---|
| Experiment | Blockage start Hard-decision prediction probability | Blockage end Hard-decision prediction probability | Blockage start Hard-decision prediction probability | Blockage end Hard-decision prediction probability |
| LSTM_classifier_1 | 0.7299 | 0.6058 | 0.9123 | 0.5614 |
| LSTM_classifier_2 | 0.2628 | 0.4818 | 0.2456 | 0.4667 |
| LSTM_classifier_3 | 0.5255 | 0.7445 | 0.8085 | 0.6842 |
| LSTM_classifier_4 | 0.4526 | 0.635 | 0.6386 | 0.6246 |
| LSTM_classifier_5 | 0.562 | 0.4964 | 0.7825 | 0.4912 |
| LSTM_classifier_6 | 0.6715 | 0.2263 | 0.8456 | 0.2561 |
| LSTM_classifier_7 | 0.6861 | 0.1752 | 0.8807 | 0.2561 |
| LSTM_classifier_8 | 0.5839 | 0.438 | 0.793 | 0.4737 |
| LSTM_classifier_9 | 0.5839 | 0.4526 | 0.8105 | 0.4807 |
| DNN_classifier_1 | 0.5839 | 0.9635 | 0.6702 | 0.9754 |
| DNN_classifier_2 | 0.365 | 0.8686 | 0.4105 | 0.8877 |

In Table 5, Blockage start Hard-decision prediction probability is the rate of correct detection of the start of the blockage (shadowing) event. In order to determine the start of the event, the soft output (probability) predicted by the network is compared to a threshold and a hard decision is made on whether this is the start of a blockage event. Blockage end Hard-decision prediction probability has a similar definition except it marks the end of the event rather than the start.

Table 5 illustrates prediction results for both test and training data. A large gap between both results indicates an over-fitted network. Table 5 also illustrates that, in general, the LSTM predictor outperforms the fully connected DNN predictor using similar configurations.

An example of the configurations for the simulations in Table 5 is provided in Table 6 as follows:

TABLE 6

| Layer (type) | Output Shape | Param # |
|---|---|---|
| lstm_1 (LSTM) | (None, 20) | 1760 |
| dropout_1 (Dropout) | (None, 20) | 0 |
| dense_1 (Dense) | (None, 100) | 2100 |
| dense_2 (Dense) | (None, 4) | 404 |

Total params: 4,264
Trainable params: 4,264
Non-trainable params: 0
None
n_input = 10
n_out = 4
units = 20
additional_layers = [100]
verbose = 0
epochs = 100
loss = categorical_crossentropy
activation = relu
train_size_percentage = 0.67
optimizer Adam
batch_size 20
data_filename = data_for_4_state.csv In Table 6, n_input is the number of time samples input at each recurrence of the LSTM cell, n_out=4 indicating 4 different labels. The configurations for LSTM classifier 1 (best performance among all LSTM and DNN classifiers) are presented in the Table 7 as follows:

TABLE 7

| | Test Data | | Training Data | |
|---|---|---|---|---|
| Experiment | Blockage start Hard-decision prediction probability | Blockage end Hard-decision prediction probability | Blockage start Hard-decision prediction probability | Blockage end Hard-decision prediction probability |
| LSTM_classifier_1 | 0.7299 | 0.6058 | 0.9123 | 0.5614 |
| LSTM_classifier_2 | 0.2628 | 0.4818 | 0.2456 | 0.4667 |
| LSTM_classifier_3 | 0.5255 | 0.7445 | 0.8035 | 0.6842 |
| LSTM_classifier_4 | 0.4526 | 0.635 | 0.6386 | 0.6246 |
| LSTM_classifier_5 | 0.562 | 0.4964 | 0.7825 | 0.4912 |
| LSTM_classifier_6 | 0.6715 | 0.2263 | 0.8456 | 0.2561 |

TABLE 7-continued

|  | Test Data | | Training Data | |
| --- | --- | --- | --- | --- |
| Experiment | Blockage start Hard-decision prediction probability | Blockage end Hard-decision prediction probability | Blockage start Hard-decision prediction probability | Blockage end Hard-decision prediction probability |
| LSTM_classifier_7 | 0.6861 | 0.1752 | 0.8807 | 0.2561 |
| LSTM_classifier_8 | 0.5839 | 0.438 | 0.793 | 0.4737 |
| LSTM_classifier_9 | 0.5839 | 0.4526 | 0.8105 | 0.4807 |
| DNN_classifier_1 | 0.5839 | 0.9635 | 0.6702 | 0.9754 |
| DNN_classifier_2 | 0.365 | 0.8686 | 0.4105 | 0.8877 |

Figure 25:
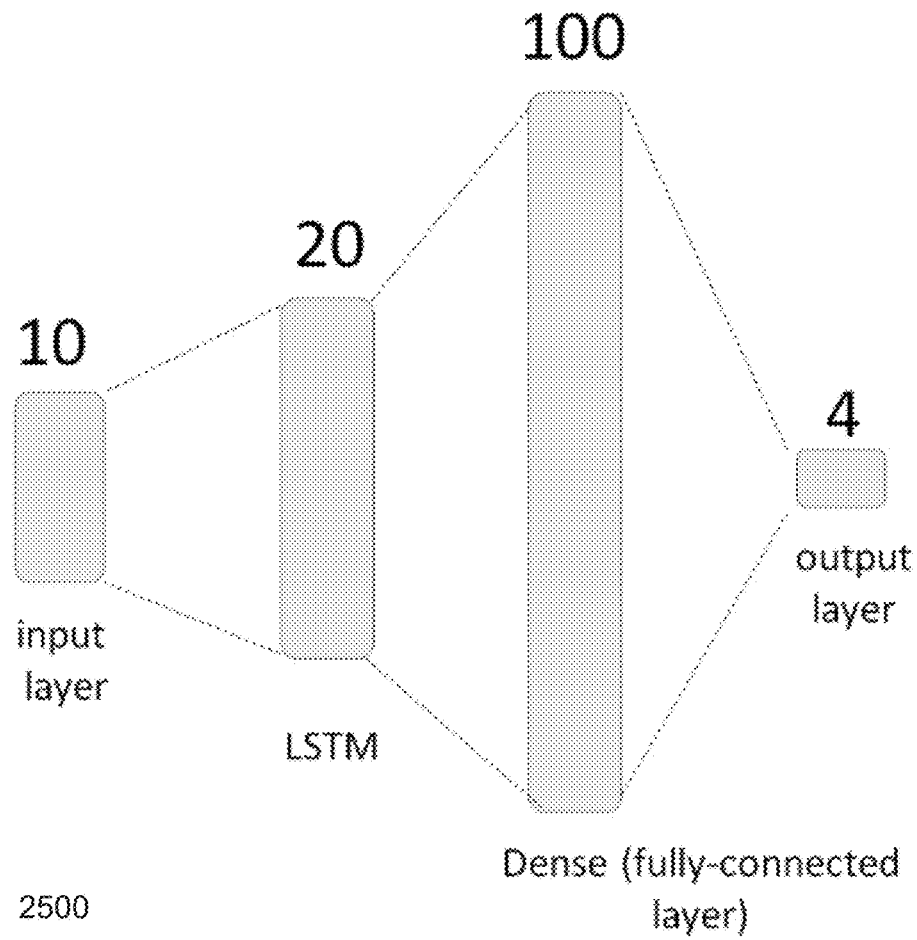
FIG. 25 illustrates an LSTM network layout, according to an embodiment.

FIG. 25 illustrates an LSTM network layout 2500, according to an embodiment. In particular, FIG. 25 illustrates the layout of the example shown above in Table 7.

Figure 26:
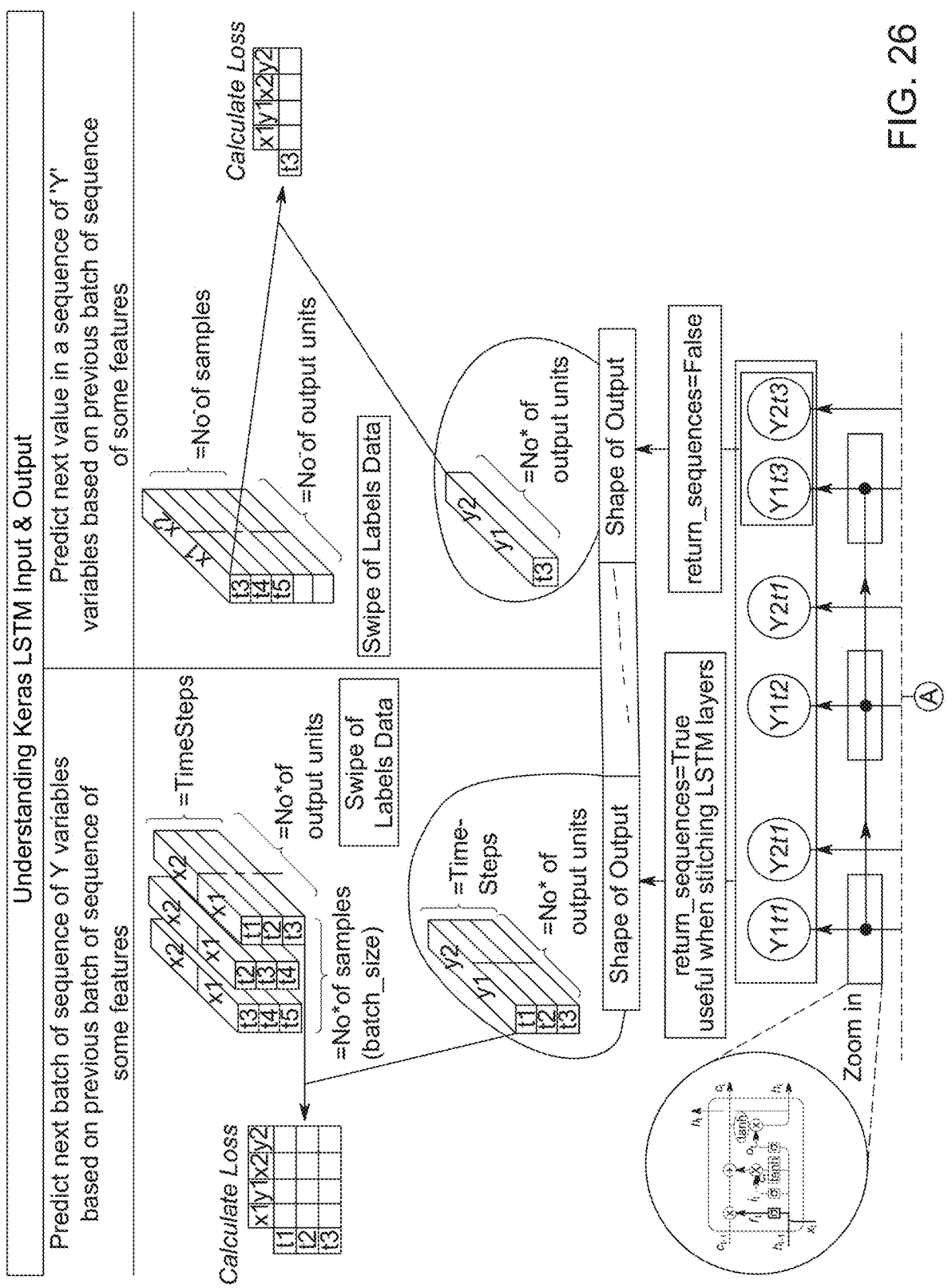
FIG. 26 illustrates inputs and outputs of LSTM implemented using Keras, according to an embodiment.
Figure 26:
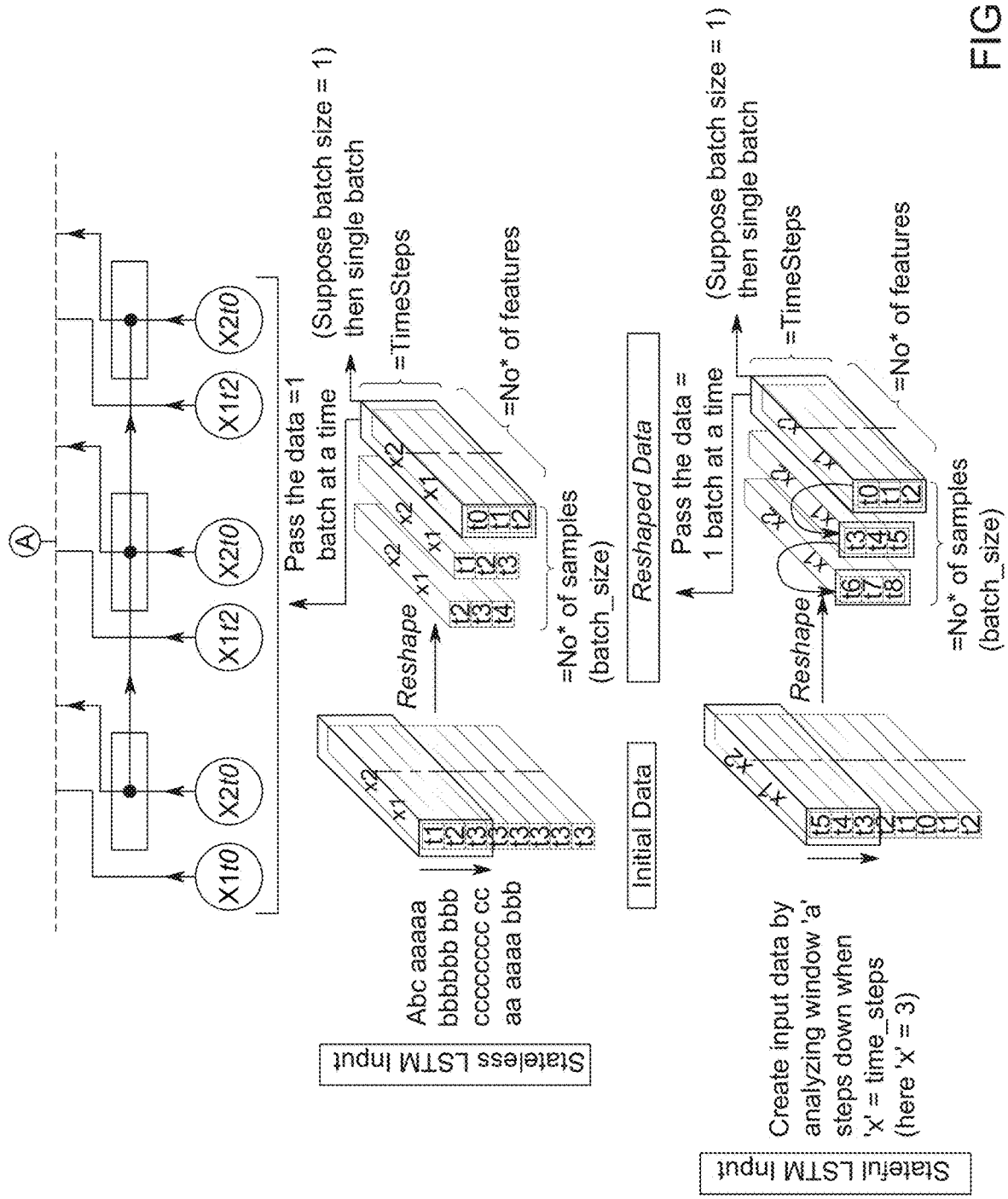

FIG. 26 illustrates inputs and outputs 2600 of LSTM implemented using Keras, according to an embodiment. In particular, FIG. 26 provides details on the different LSTM parameters, when implementing LSTM using Keras.

Figure 27:
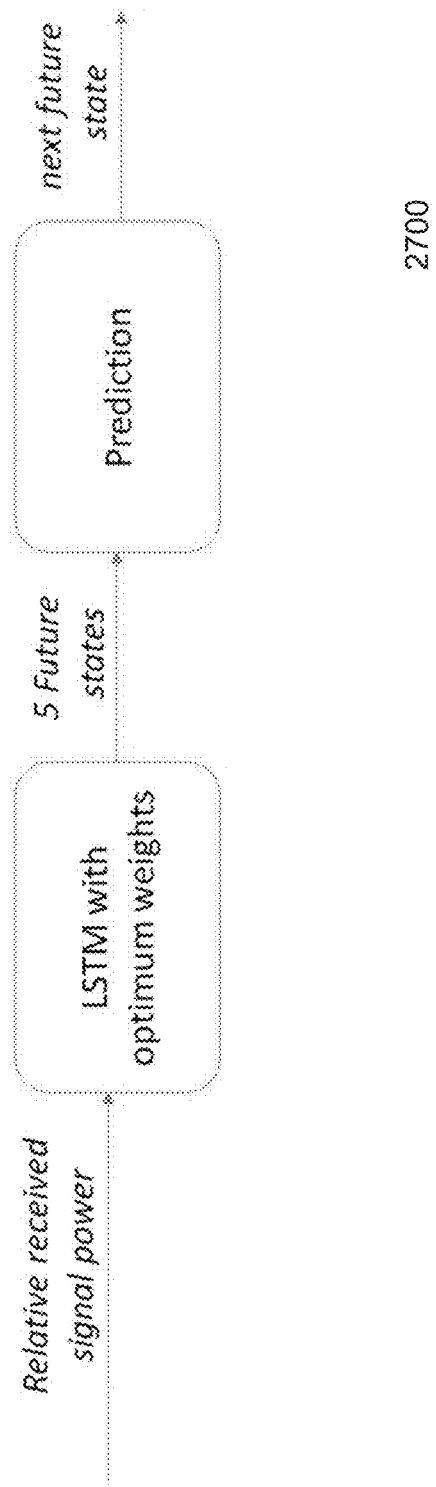
FIG. 27 illustrates the prediction phase, according to an embodiment.

FIG. 27 illustrates the prediction phase 2700, according to an embodiment.

In step 2701, the relative received signal power is fed into the LSTM network, in order to be trained to have optimum weights.

In step 2702, the network outputs 5 future samples (or states), such as channel state predictions 20, 40, 60, 80, and 100 ms into the future.

In step 2703, the 5 predicted future samples are input into a decision function (prediction) which then predicts a blockage if any of the samples predicts a blockage. This enhances the prediction accuracy from 61% to about 83% for the LPF relative received signal prediction method.

Figure 28:
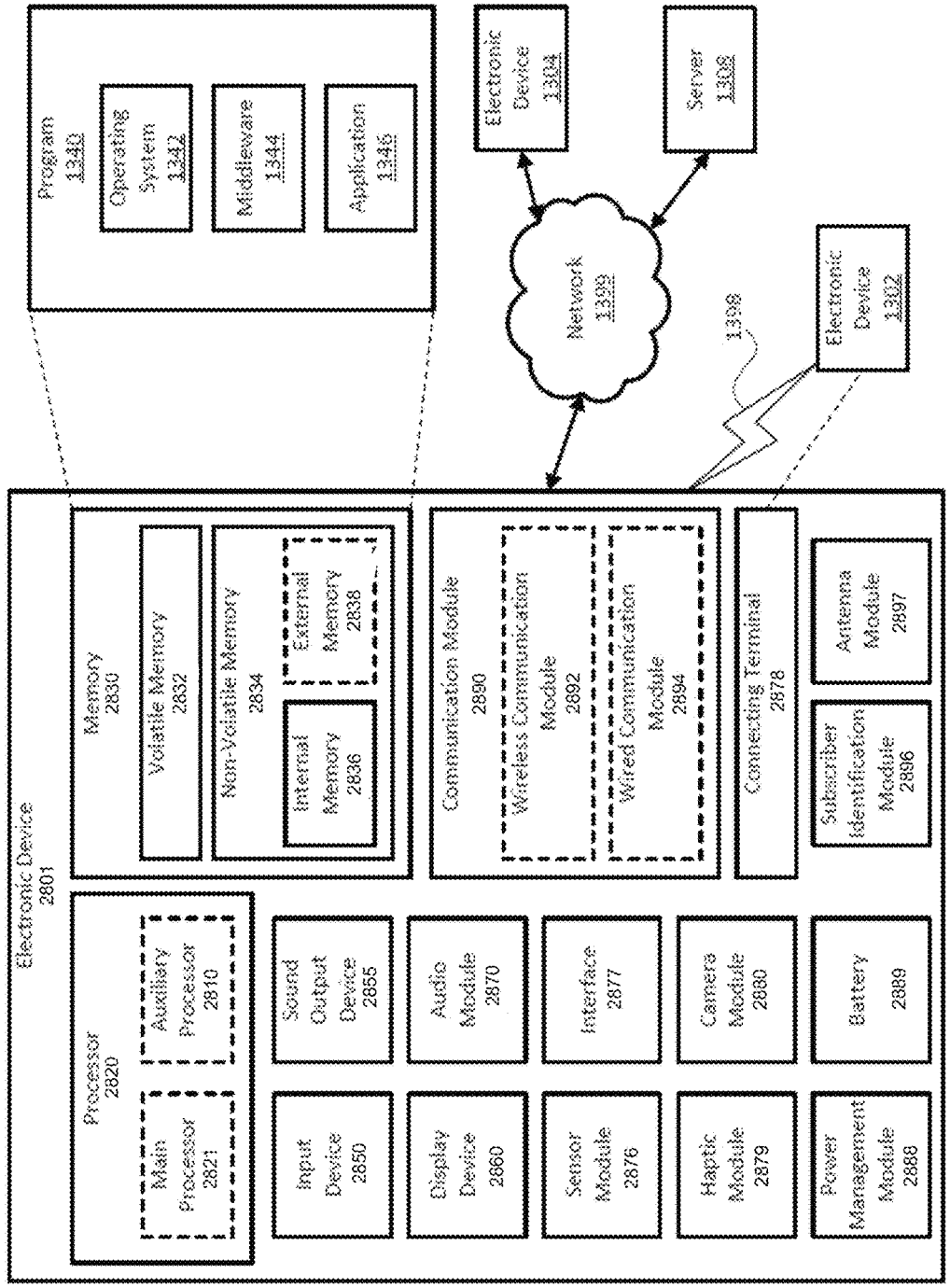
FIG. 28 is a block diagram of an electronic device in a network environment, according to an embodiment.

FIG. 28 is a block diagram of an electronic device in a network environment 2800, according to an embodiment. Referring to FIG. 28, an electronic device 2801 in a network environment 2800 may communicate with an electronic device 2802 via a first network 2898 (e.g., a short-range wireless communication network), or an electronic device 2804 or a server 2808 via a second network 2899 (e.g., a long-range wireless communication network). The electronic device 2801 may communicate with the electronic device 2804 via the server 2808, The electronic device 2801 may include a processor 2820, a memory 2830, an input device 2840, a sound output device 2855, a display device 2860, an audio module 2870, a sensor module 2876, an interface 2877, a haptic module 2879, a camera module 2880, a power management module 2888, a battery 2889, a communication module 2890, a subscriber identification module (SIM) card 2896, or an antenna module 2894. In one embodiment, at least one (e.g., the display device 2860 or the camera module 2880) of the components may be omitted from the electronic device 2801, or one or more other components may be added to the electronic device 2801. Some of the components may be implemented as a single integrated circuit (IC). For example, the sensor module 2876 (e.g., a fingerprint sensor, an iris sensor, or an illuminance sensor) may be embedded in the display device 2860 (e.g., a display).

The processor 2820 may execute, for example, software (e.g., a program 2840) to control at least one other component (e.g., a hardware or a software component) of the electronic device 2801 coupled with the processor 2820 and may perform various data processing or computations. As at least part of the data processing or computations, the processor 2820 may load a command or data received from another component (e.g., the sensor module 2846 or the communication module 2890) in volatile memory 2832, process the command or the data stored in the volatile memory 2832, and store resulting data in non-volatile memory 2834. The processor 2820 may include a main processor 2821 (es., a central processing unit (CPU) or an application processor (AP)), and an auxiliary processor 2823 (e.g., a graphics processing unit (GPU), an image signal processor (ISP), a sensor hub processor, or a communication processor (CP)) that is operable independently from, or in conjunction with, the main processor 2821. Additionally or alternatively, the auxiliary processor 2823 may be adapted to consume less power than the main processor 2821, or execute a particular function. The auxiliary processor 2823 may be implemented as being separate from, or a part of, the main processor 2821.

The auxiliary processor 2823 may control at least some of the functions or states related to at least one component (e.g., the display device 2860, the sensor module 2876, or the communication module 2890) among the components of the electronic device 2801, instead of the main processor 2821 while the main processor 2821 is in an inactive (e.g., sleep) state, or together with the main processor 2821 while the main processor 2821 is in an active state (e.g., executing an application). The auxiliary processor 2823 (e.g., an image signal processor or a communication processor) may be implemented as part of another component (e.g., the camera module 2880 or the communication module 2890) functionally related to the auxiliary processor 2823.

The memory 2830 may store various data used by at least one component (e.g., the processor 2820 or the sensor module 2876) of the electronic device 2801. The various data may include, for example, software (e.g., the program 2840) and input data or output data for a command related thereto. The memory 2830 may include the volatile memory 2832 or the non-volatile memory 2834.

The program 2840 may be stored in the memory 2830 as software, and may include, for example, an operating system (OS) 2842, middleware 2844, or an application 2846.

The input device 2850 may receive a command or data to be used by another component (e.g., the processor 2820) of the electronic device 2801, from the outside (e.g., a user) of the electronic device 2801. The input device 2850 may include, for example, a microphone, a mouse, or a keyboard.

The sound output device 2855 may output sound signals to the outside of the electronic device 2801. The sound output device 2855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2860 may visually provide information to the outside (e.g., a user) of the electronic device 2801. The display device 2860 may include, for example, a display, a hologram device, or a projector and control circuitry to control a corresponding one of the display, hologram device, and projector. The display device 2860 may include touch circuitry adapted to detect a touch, or sensor circuitry (e.g., a pressure sensor) adapted to measure the intensity of force incurred by the touch.

The audio module 2870 may convert a sound into an electrical signal and vice versa. The audio module 2870 may obtain the sound via the input device 2850 or output the sound via the sound output device 2855 or a headphone of an external electronic device 2802 directly (e.g., wired) or wirelessly coupled with the electronic device 2801.

The sensor module 2876 may detect an operational state (e.g., power or temperature) of the electronic device 2801 or an environmental state (e.g., a state of a user) external to the electronic device 2801, and then generate an electrical signal or data value corresponding to the detected state. The sensor module 2876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2877 may support one or more specified protocols to be used for the electronic device 2801 to be coupled with the external electronic device 2802 directly (e.g., wired) or wirelessly. The interface 2877 may include, for example, a high-definition multimedia interface (HDMI), a universal serial bus (USB) interface, a secure digital (SD) card interface, or an audio interface.

A connecting terminal 2878 may include a connector via which the electronic device 2801 may be physically connected with the external electronic device 2802. The connecting terminal 2878 may include, for example, an HDMI connector, a USB connector, an SD card connector, or an audio connector (e.g., a headphone connector).

The haptic module 2879 may convert an electrical signal into a mechanical stimulus (e.g., a vibration or a movement) or an electrical stimulus which may be recognized by a user via tactile sensation or kinesthetic sensation. The haptic module 2879 may include, for example, a motor, a piezoelectric element, or an electrical stimulator.

The camera module 2880 may capture a still image or moving images. The camera module 2880 may include one or more lenses, image sensors, image signal processors, or flashes.

The power management module 2888 may manage power supplied to the electronic device 2801. The power management module 2888 may be implemented as at least part of, for example, a power management integrated circuit (PMIC).

The battery 2889 may supply power to at least one component of the electronic device 2801. The battery 2889 may include, for example, a primary cell which is not rechargeable, a secondary cell which is rechargeable, or a fuel cell.

The communication module 2890 may support establishing a direct (e.g., wired) communication channel or a wireless communication channel between the electronic device 2801 and the external electronic device (e.g., the electronic device 2802, the electronic device 2804, or the server 2808) and performing communication via the established communication channel. The communication module 2890 may include one or more communication processors that are operable independently from the processor 2820 (e.g., the AP) and supports a direct (e.g., wired) communication or a wireless communication. The communication module 2890 may include a wireless communication module 2892 (e.g., a cellular communication module, a short-range wireless communication module, or a global navigation satellite system (GNSS) communication module) or a wired communication module 2894 (e.g., a local area network (LAN) communication module or a power line communication (PLC) module). A corresponding one of these communication modules may communicate with the external electronic device via the first network 2898 (e.g., a short-range communication network, such as Bluetooth™, wireless-fidelity (Wi-fi) direct, or a standard of the Infrared Data Association (IrDA)) or the second network 2899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2892 may identify and authenticate the electronic device 2801 in a communication network, such as the first network 2898 or the second network 2899, using subscriber information (e.g., international mobile subscriber identity (IMSI)) stored in the subscriber identification module 2896.

The antenna module 2897 may transmit or receive a signal or power to or from the outside (e.g., the external electronic device) of the electronic device 2801. The antenna module 2897 may include one or more antennas, and, therefrom, at least one antenna appropriate for a communication scheme used in the communication network, such as the first network 2898 or the second network 2899, may be selected, for example, by the communication module 2890 (e.g., the wireless communication module 2892). The signal or the power may then be transmitted or received between the communication module 2890 and the external electronic device via the selected at least one antenna.

As described above, the present application provides at least the following improvements on the conventional art:

1. Implementing this blockage model and its prediction algorithm within a system level simulator that uses specific indoor and outdoor scenarios dictated by 3GPP specifications. A main contribution in such an extension is to apply realistic mobility models for human blockers, especially in an indoor scenario. Human mobility models have long been studied in the context of opportunistic networks and can be readily used in the context of human blockage for mmWaves and THz indoor communications.

2. The ability to predict blockage of the channel between a transmitter and a receiver is also useful in the classification of the channel (LoS/NloS), which is in turn useful in such applications as UR localization where the location estimate is inaccurate if a LoS assumption is falsely made. Moreover, a "confidence metric" (CM) may be provided, which assumes a value between 0 and 1. This CM value represents the probability that the channel is a LoS, i.e., is not blocked. The value of the CM is directly derived from the accuracy of blockage prediction/identification of the receiver.

Commands or data may be transmitted or received between the electronic device 2801 and the external electronic device 2804 via the server 2808 coupled with the second network 2899. Each of the electronic devices 2802 and 2804 may be a device of a same type as, or a different type, from the electronic device 2801. All or some of operations to be executed at the electronic device 2801 may be executed at one or more of the external electronic devices 2802, 2804, or 2808. For example, if the electronic device 2801 should perform a function or a service automatically, or in response to a request from a user or another device, the electronic device 2801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2801. The electronic device 2801 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method for determining triggering of a conditional handover, comprising:
    estimating, using a line-of-sight (LoS) channel, a received signal power as a function of a blocker that simulates a human body;
    determining multiple stages of potential blockage of the received signal power by the blocker;
    predicting, using long-short-term memory (LTSM), a channel state and the potential blockage; and
    determining whether to trigger the conditional handover based on the predicted channel state and potential blockage.

2. The method of claim 1,
    wherein the estimating is performed using a double-truncated multiple knife edge (DTMKE) diffraction model.

3. The method of claim 2,
    wherein the LoS channel is a terahertz (THz) channel.

4. The method of claim 1,
    wherein the multiple stages of the potential blockage include one or more of the following stages: decay, shadowing, rise, and unshadowing.

5. The method of claim 3,
    wherein the blocker simulates a human body moving to intercept the LOS channel in an indoor environment.

6. The method of claim 5,
    wherein at least one threshold is applied to the received signal power to classify one of the multiple stages.

7. The method of claim 6,
    wherein future channel samples are predicted based on a labeled final predicted value for a next time sample ahead.

8. The method of claim 7,
    wherein the predicted future samples are input into a decision function that predicts a blockage if any of the samples predicts the blockage.

9. The method of claim 8,
    wherein a number of the predicted future channel samples is five.

10. The method of claim 9, further comprising:
    feeding the five predicted future channel samples into an LSTM network to arrive at optimum LSTM network weights.

11. An electronic device, comprising:
    at least one processor; and
    at least one memory operatively connected with the at least one processor, the at least one memory storing instructions, which when executed, instruct the at least one processor to determine whether to trigger a conditional handover by:
        estimating, using a line-of-sight (LoS) channel, a received signal power as a function of a blocker that simulates a human body;
        determining multiple stages of potential blockage of the received signal power by the blocker;
        predicting, using long-short-term memory (LTSM), a channel state and the potential blockage; and
        determining whether to trigger the conditional handover based on the predicted channel state and potential blockage.

12. The electronic device of claim 11,
    wherein the estimate is performed using a double-truncated multiple knife edge (DTMKE) diffraction model.

13. The method of claim 12,
    wherein the LoS channel is a terahertz (THz) channel.

14. The method of claim 11,
    wherein the multiple stages of the potential blockage include one or more of the following stages: decay, shadowing, rise, and unshadowing.

15. The method of claim 13,
    wherein the blocker simulates a human body moving to intercept the LOS channel in an indoor environment.

16. The method of claim 15,
    wherein at least one threshold is applied to the received signal power to classify one of the multiple stages.

17. The method of claim 16,
    wherein future channel samples are predicted based on a labeled final predicted value for a next time sample ahead.

18. The method of claim 17,
    wherein the predicted future samples are input into a decision function which predicts a blockage if any of the samples predicts the blockage.

19. The method of claim 18,
    wherein a number of the predicted future channel samples is five.

20. The method of claim 19, further comprising:
    feeding the five predicted future channel samples into an LSTM network to arrive at optimum LSTM network weights.

* * * * *